(12) United States Patent
Tian

(10) Patent No.: US 11,772,786 B2
(45) Date of Patent: Oct. 3, 2023

(54) METHOD OF FLIGHT CONTROL IN A VERTICAL TAKEOFF AND LANDING AERIAL VEHICLE WITH ANGLED PROPELLERS

(71) Applicant: Shanghai Autoflight Co., Ltd., Shanghai (CN)

(72) Inventor: Yu Tian, Hong Kong (CN)

(73) Assignee: SHANGHAI AUTOFLIGHT CO., LTD., Jiangsu Province (CN)

( * ) Notice: Subject to any disclaimer, the term of this patent is extended or adjusted under 35 U.S.C. 154(b) by 0 days.

(21) Appl. No.: 17/821,480

(22) Filed: Aug. 23, 2022

(65) Prior Publication Data

US 2023/0166837 A1 Jun. 1, 2023

Related U.S. Application Data

(63) Continuation of application No. 17/396,704, filed on Aug. 8, 2021, now Pat. No. 11,453,489, which is a continuation-in-part of application No. 16/281,020, filed on Feb. 20, 2019, now abandoned.

(51) Int. Cl.
| | |
|---|---|
| *B64C 29/00* | (2006.01) |
| *B64C 5/08* | (2006.01) |
| *B64C 39/02* | (2023.01) |
| *B64U 30/10* | (2023.01) |
| *B64U 30/20* | (2023.01) |
| *B64U 50/13* | (2023.01) |

(52) U.S. Cl.
CPC ............ *B64C 29/0025* (2013.01); *B64C 5/08* (2013.01); *B64C 39/024* (2013.01); *B64U 30/10* (2023.01); *B64U 30/20* (2023.01); *B64U 50/13* (2023.01)

(58) Field of Classification Search
CPC ............................. B64C 5/08; B64C 29/0025
See application file for complete search history.

(56) References Cited

U.S. PATENT DOCUMENTS

| | | | |
|---|---|---|---|
| 6,233,491 B1* | 5/2001 | Kordis | A61B 18/1492 |
| | | | 600/374 |
| 2006/0151666 A1* | 7/2006 | VanderMey | B64C 29/0016 |
| | | | 244/12.3 |
| 2018/0105267 A1* | 4/2018 | Tighe | B64C 27/52 |
| 2019/0127056 A1* | 5/2019 | Weekes | B64D 9/00 |

* cited by examiner

*Primary Examiner* — Nicholas McFall
(74) *Attorney, Agent, or Firm* — WPAT LAW, P.C.; Anthony King

(57) ABSTRACT

A method of flight control including having a vertical takeoff and landing aerial vehicle that has a plurality of lift propellers disposed on two linear support pieces, and there are two vertical stabilizers disposed at the rear of the two linear support pieces. A rotating shaft of each lift propeller from among the multiple lift propellers outwards forms an angle of 5 degrees to 15 degrees relative to a vertical plane of the aerial vehicle perpendicular to a horizontal plane of the aerial vehicle. The aerial vehicle of the present disclosure improves the heading axis control capacity of the aerial vehicle and reduces the restriction to the design size of the aerial vehicle.

10 Claims, 26 Drawing Sheets

METHOD OF FLIGHT CONTROL IN A VERTICAL TAKEOFF AND LANDING AERIAL VEHICLE WITH ANGLED PROPELLERS

CROSS-REFERENCES

The This application claims domestic priority to, and is a Continuation Application of, U.S. patent application Ser. No. 17/396,704, filed on Aug. 8, 2021, now pending, which
a. is a Continuation-In-Part of patent application Ser. No. 16/281,020, filed on Feb. 20, 2019, now abandoned;
b. claims foreign priority to China Patent Application No. 202021632738.7, filed on Aug. 7, 2020, DAS code 4FB5; and
c. claims foreign priority to China Patent Application No. 202022458456.6, filed on Oct. 29, 2020, DAS code 4F56;

all of which are hereby incorporated by reference in their entireties.

Although incorporated by reference in their entireties, no arguments or disclaimers made in the related application apply to this application. Any disclaimer that may have and occurred or might occur during the prosecution of the above-referenced application is hereby expressly rescinded.

TECHNICAL FIELD

The present disclosure relates to the technical field of unmanned aerial vehicles, and particularly relates to a vertical takeoff and landing unmanned aerial vehicle.

BACKGROUND

An existing vertical takeoff and landing (VTOL) unmanned aerial vehicle has low heading axis control capacity in a rotor wing flight stage. In order to avoid interference with the entire structure of an airframe, the design size of an existing rotor wing arrangement structure is restrained.

SUMMARY

The present disclosure relates to a vertical takeoff and landing unmanned aerial vehicle to solve the problem that an unmanned aerial vehicle in the existing art has low heading axis control capacity or the design size is restrained.

The present disclosure provides a vertical takeoff and landing unmanned aerial vehicle, including:
a main body;
a left main wing and a right main wing which are respectively engaged with the main body;
a left front wing and a right front wing which are respectively engaged with the main body;
a left linear supporting piece arranged on the left main wing;
a right linear supporting piece arranged on the right main wing;
a first group of multiple lift propellers arranged on the left linear supporting piece; and
a second group of multiple lift propeller arranged on the right linear supporting piece.

An outwards deflecting included angle less than 90 degrees is provided between a rotating shaft of each of the first group of multiple lift propellers and a plane in a lengthwise direction of the unmanned aerial vehicle. An outwards deflecting included angle less than 90 degrees is provided between a rotating shaft of each of the second group of multiple lift propellers and the plane in the lengthwise direction of the unmanned aerial vehicle.

In one embodiment of the present disclosure, the included angles between the rotating shaft of each of the first group of multiple lift propellers as well as the rotating shaft of each of the second group of multiple lift propellers and the plane in the lengthwise direction of the unmanned aerial vehicle are 5 degrees to 15 degrees.

In one embodiment of the present disclosure, included angles between two adjacent lift propellers in the first group of multiple lift propellers and the plane in the lengthwise direction of the unmanned aerial vehicle are different, and included angles between two adjacent lift propellers in the second group of multiple lift propellers and the plane in the lengthwise direction of the unmanned aerial vehicle are different.

In one embodiment of the present disclosure, an end part of the left main wing away from the main body is provided with a left wing tip vertical stabilizer; an end part of the right main wing away from the main body is provided with a right wing tip vertical stabilizer; and the left wing tip vertical stabilizer and the right wing tip vertical stabilizer are of platy structures parallel to the plane in the lengthwise direction of the unmanned aerial vehicle.

Tops of the left wing tip vertical stabilizer and the right wing tip vertical stabilizer are respectively provided with wing tip lift propellers.

In one embodiment of the present disclosure, a rotating shaft of each wing tip lift propeller outwards deflects 5 to 15 degrees relative to the plane in the lengthwise direction of the unmanned aerial vehicle.

The present disclosure provides a vertical takeoff and landing unmanned aerial vehicle, including:
a main body;
a left main wing and a right main wing which are respectively engaged with the main body;
a left front wing and a right front wing which are respectively engaged with the main body;
a left linear supporting piece arranged on the left main wing;
a right linear supporting piece arranged on the right main wing;
a first group of multiple lift propeller arranged on the left linear supporting piece; and
a second group of multiple lift propeller arranged on the right linear supporting piece.

A rotating shaft of each lift propeller from among the first group of multiple lift propellers and the second group of multiple lift propellers outwards forms an angle of 5 degrees to 15 degrees relative to a vertical plane of the unmanned aerial vehicle perpendicular to a horizontal plane of the unmanned aerial vehicle.

In one embodiment of the present disclosure, the unmanned aerial vehicle further includes a left vertical stabilizer arranged at the rear part of the left linear supporting piece and a right vertical stabilizer arranged at the rear part of the right linear supporting piece.

In one embodiment of the present disclosure, the unmanned aerial vehicle further includes a left additional lift propeller arranged on a top terminal of the left vertical stabilizer and a right additional lift propeller arranged on a top terminal of the right vertical stabilizer.

In one embodiment of the present disclosure, a rotating shaft of each of the left additional lift propeller and the right additional lift propeller outwards forms an angle of 5 degrees to 15 degrees relative to a vertical plane of the unmanned aerial vehicle perpendicular to a horizontal plane of the unmanned aerial vehicle.

In one embodiment of the present disclosure, the rotating shafts of the left additional lift propeller, the right additional lift propeller, and each lift propeller from among the first group of multiple lift propellers and the second group of multiple lift propellers outwards form angles of 5 degrees to 15 degrees relative to the vertical plane of the unmanned aerial vehicle perpendicular to the horizontal plane of the unmanned aerial vehicle.

In one embodiment of the present disclosure, the rotating shafts of the left additional lift propeller, the right additional lift propeller, and each lift propeller from among the first group of multiple lift propellers and the second group of multiple lift propellers outwards form angles of 8 degrees relative to the vertical plane of the unmanned aerial vehicle perpendicular to the horizontal plane of the unmanned aerial vehicle.

In one embodiment of the present disclosure, the unmanned aerial vehicle further includes a detachable cabin attached to a bottom side of the main body.

In one embodiment of the present disclosure, the cabin is a passenger cabin.

In one embodiment of the present disclosure, the cabin is a cargo space.

In one embodiment of the present disclosure, the outward angle causes lift force loss of 0.5 to 3%.

In one embodiment of the present disclosure, the outward angle causes a yawing moment to be increased by 8 to 20%.

In one embodiment of the present disclosure, the outward angle causes the lift force loss of 0.97%.

In one embodiment of the present disclosure, the outward angle causes the yawing moment to be increased by 13.92%.

In one embodiment of the present disclosure, the left linear supporting piece is configured to connect the left main wing with the left front wing.

The present disclosure provides a vertical takeoff and landing unmanned aerial vehicle, including: a main body; a left main wing and a right main wing which are respectively engaged with the main body; a left front wing and a right front wing which are respectively engaged with the main body; a left linear supporting piece arranged on the left main wing; a right linear supporting piece arranged on the right main wing; a first group of multiple lift propeller arranged on the left linear supporting piece; and a second group of multiple lift propeller arranged on the right linear supporting piece. A rotating shaft of each lift propeller from among the first group of multiple lift propellers and the second group of multiple lift propellers outwards forms an angle of 5 degrees to 15 degrees relative to a vertical plane of the unmanned aerial vehicle perpendicular to a horizontal plane of the unmanned aerial vehicle. In the vertical takeoff and landing unmanned aerial vehicle provided by the present disclosure, in a way of setting the rotating shaft of each of the multiple lift propellers to outward form a certain angle (5 degrees to 15 degrees) relative to the vertical plane of the unmanned aerial vehicle perpendicular to the horizontal plane of the unmanned aerial vehicle, the lift propeller rotates to generate a horizontal component. When rotating speeds of the top lift propellers of the left linear supporting piece and the right linear supporting piece are different, the horizontal components generated by the lift propellers will increase the yawing moment, so that the heading axis control capacity of the unmanned aerial vehicle is improved, and the restriction to the design size of the unmanned aerial vehicle is reduced.

Although the present specification contains many specific implementation details, these details should not be construed as limitations to any disclosure or the scope of protection claimed, but as a description of features of specific realizing modes for specific implementation modes. Certain features described in the present specification in the contexts of different realizing modes can also be implemented in combination in separate realizing modes. On the contrary, various features described in the context of separate implementations can also be implemented in multiple realizing modes individually or in any suitable subcombination. In addition, although features may be described above and below as working in certain combinations and even initially described as such, in some cases, one or more features from the described/claimed combinations may be culled out from the combinations, and the combinations described/claimed may aim at the subcombinations or changes of the subcombinations.

Many realizing modes have been described. However, it should be understood that various modifications can be made without departing from the spirit and scope of the present disclosure. For example, the example operations, methods, or processes described herein may include more or fewer steps than those described. In addition, the steps in these example operations, methods, or processes may be performed in different alternative ways than those described or shown in the figures.

The details of one or more realizing modes of the subject described in the present disclosure are set forth in the accompanying drawings and the following description. Other features, aspects, and advantages of the subject will become apparent according to the specification, drawings, and claims.

BRIEF DESCRIPTION OF THE DRAWINGS

It should be noted that the drawings may be in a simplified form and may not be in exact scale. With reference to the disclosure herein, for convenience and clarity only, with reference to the accompanying drawings, directional terms such as top, bottom, left, right, up, down, above, over, below, under, back, front, far end and near end are used. These directional terms should not be construed as limiting the scope of the implementation modes in any way.

Figure 1A:
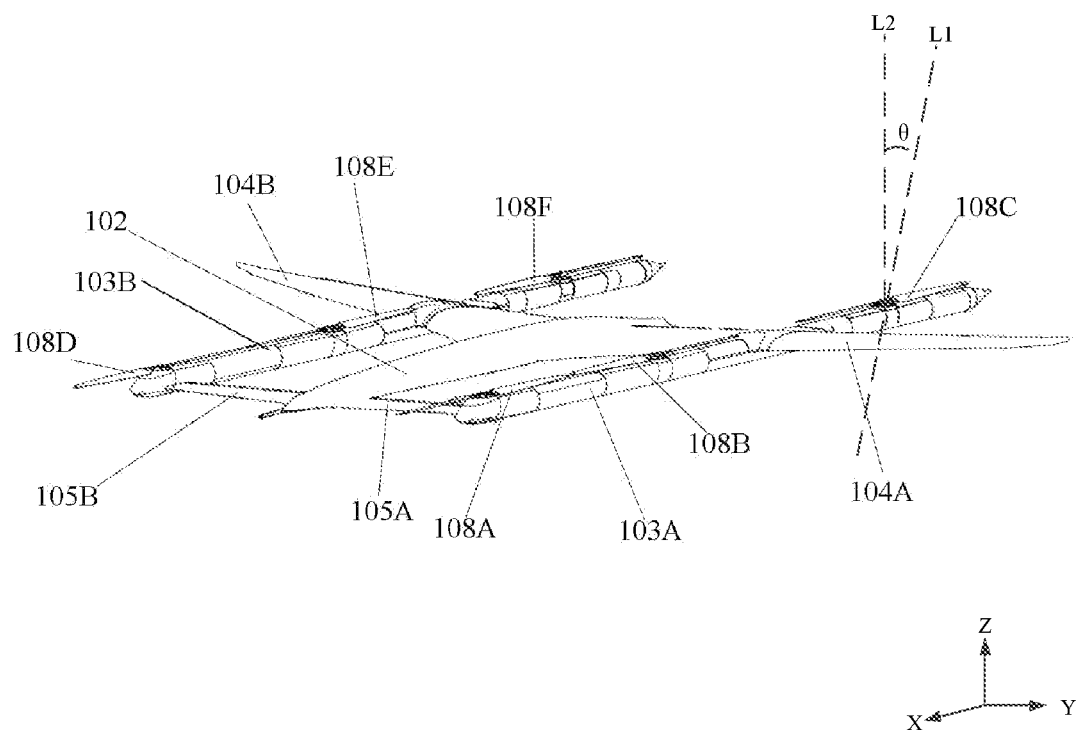
FIG. 1a is a top perspective drawing of an implementation mode of a vertical takeoff and landing (VTOL) unmanned aerial vehicle system according to one aspect of the implementation mode.

When referring to elements marked in the drawings, the same part is indicated by the same reference sign in all drawings of the specification:

100: unmanned aerial vehicle; 101: flight platform; 102: main body; 103A: left linear supporting piece; 103B: right linear supporting piece; 104A: left main wing; 104B: right main wing; 105A: left front wing; 105B: right front wing; 106A: left vertical stabilizer; 106B: right vertical stabilizer; 107: propulsion propeller; 107A: left propulsion propeller; 107B: right propulsion propeller; 108A: first lift propeller; 108B: second lift propeller; 108C: third lift propeller; 108D: fourth lift propeller; 108E: fifth lift propeller; 108F: sixth lift propeller; 109A: left wing tip propeller; 109B: right wing tip propeller; 110A: left wing tip vertical stabilizer; 110B: right wing tip vertical stabilizer; 111A: left folding leg; 111B: right folding leg; 112A: first reed blade; 112B: second reed blade; 112C: third reed blade; 112D: fourth reed blade; 116: vertical expander; 117: a center propulsion propeller; 130: cargo space; 135A: first cabin reed blade; 135B: second cabin reed blade; 135C: third cabin reed blade; 135D: fourth cabin reed blade; 140: passenger cabin; 145A: cabin leg; 145B: cabin leg; 145C: cabin leg; 145D: cabin leg; 147: cabin attachment lock catch; 148: electric wheel; 149: shell; 150: energy storage cell in flight platform; 155: energy storage cell in cabin; 160: floating device; 170A: left additional lift propeller; 170B: right additional lift propeller; 180: aileron; 191A: left tail fin; 191B: right tail fin; 192: traction propeller.

DETAILED DESCRIPTION OF THE EMBODIMENTS

Now by turning to the detailed description of the following implementation modes, different aspects of the various implementation modes can be better understood, which are presented as illustrated examples of the implementation modes defined in the claims. It is clearly understood that the implementation modes defined by the claims may be broader than the illustrated implementation modes described below.

The words used to describe various implementation modes in the present specification should be understood not only to have their common defined meanings, but also to include special definitions beyond the scope of commonly defined meanings in the structures, materials or behaviors in the present specification. Therefore, if an element can be understood as including more than one meaning in the context of the present specification, its use in the claims must be understood as being universal to all possible meanings supported by the specification and the word itself.

The term "unmanned aerial vehicle" is defined as a flight transportation system with at least one propeller serving as a propulsion source. The term "unmanned aerial vehicle" can include both "manned" and "unmanned" flight transportation systems. A manned unmanned aerial vehicle can refer to a flight transportation system that carries human passengers, and no human passengers have the right to control the unmanned aerial vehicle. A manned unmanned aerial vehicle can also refer to a flight transportation system that carries human passengers, and some of the human passengers or one human passenger has certain right to control the unmanned aerial vehicle.

As in the background art, an existing vertical takeoff and landing (VTOL) has low heading axis control capacity and restrained structural design size. In order to solve this problem, the present disclosure provides a vertical takeoff and landing (VTOL) unmanned aerial vehicle, including: a main body; a left main wing and a right main wing which are respectively engaged with the main body; a left front wing and a right front wing which are respectively engaged with the main body; a left linear supporting piece arranged on the left main wing; a right linear supporting piece arranged on the right main wing; a first group of multiple lift propellers arranged on the left linear supporting piece; and a second group of multiple lift propellers arranged on the right linear supporting piece. A rotating shaft of each lift propeller from among the first group of multiple lift propellers and the second group of multiple lift propellers outwards forms an angle of 5 degrees to 15 degrees relative to a vertical plane of the unmanned aerial vehicle perpendicular to a horizontal plane of the unmanned aerial vehicle.

The technical solution of the present disclosure is described in detail below in combination with specific accompanying drawings.

Figure 1B:
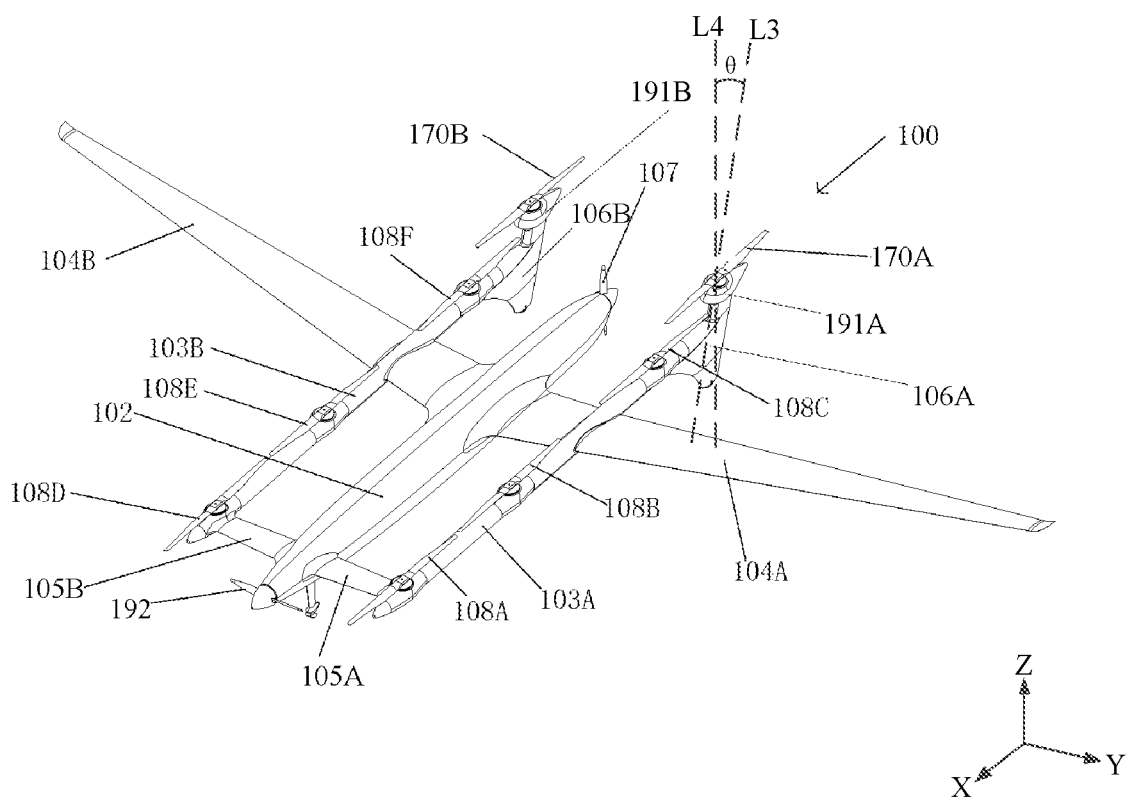
FIG. 1b is a top perspective drawing of an implementation mode of a VTOL unmanned aerial vehicle system according to one aspect of the implementation mode.
Figure 1C:
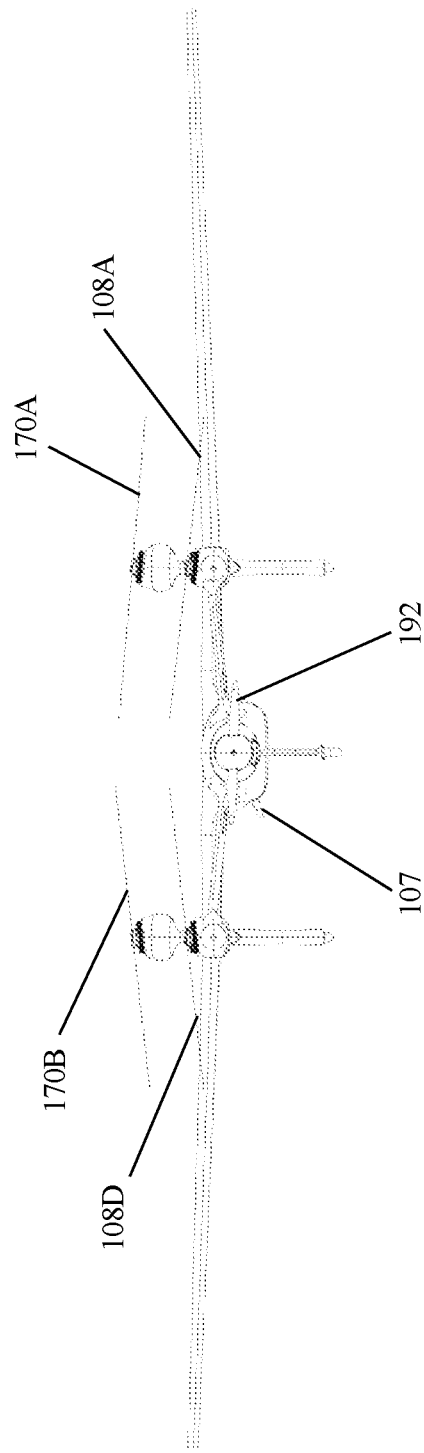
FIG. 1c is a front view of an implementation mode of a VTOL unmanned aerial vehicle system according to another aspect of the implementation mode.
Figure 1D:
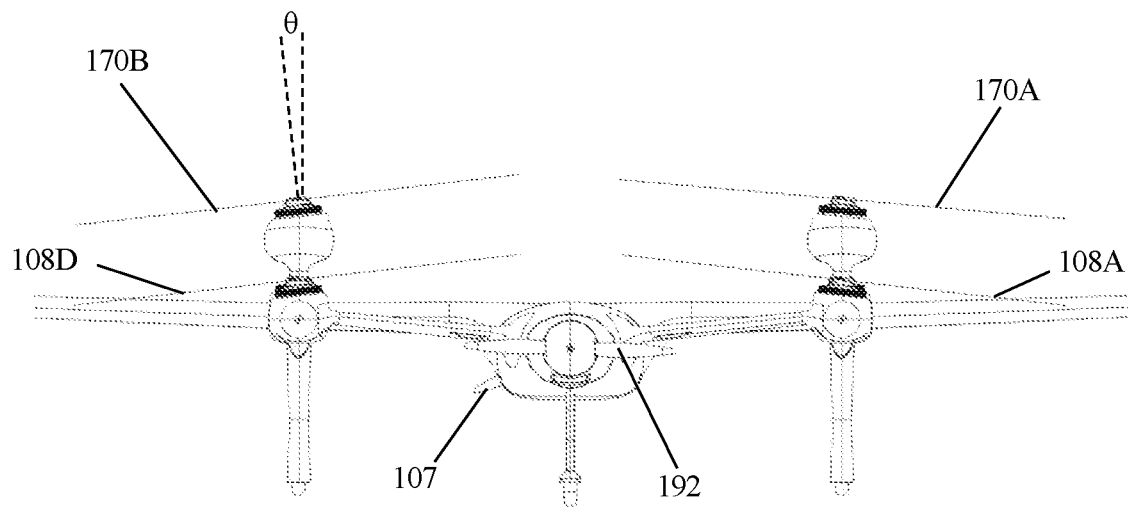
FIG. 1d is a partially enlarged diagram of FIG. 1c.
Figure 1E:
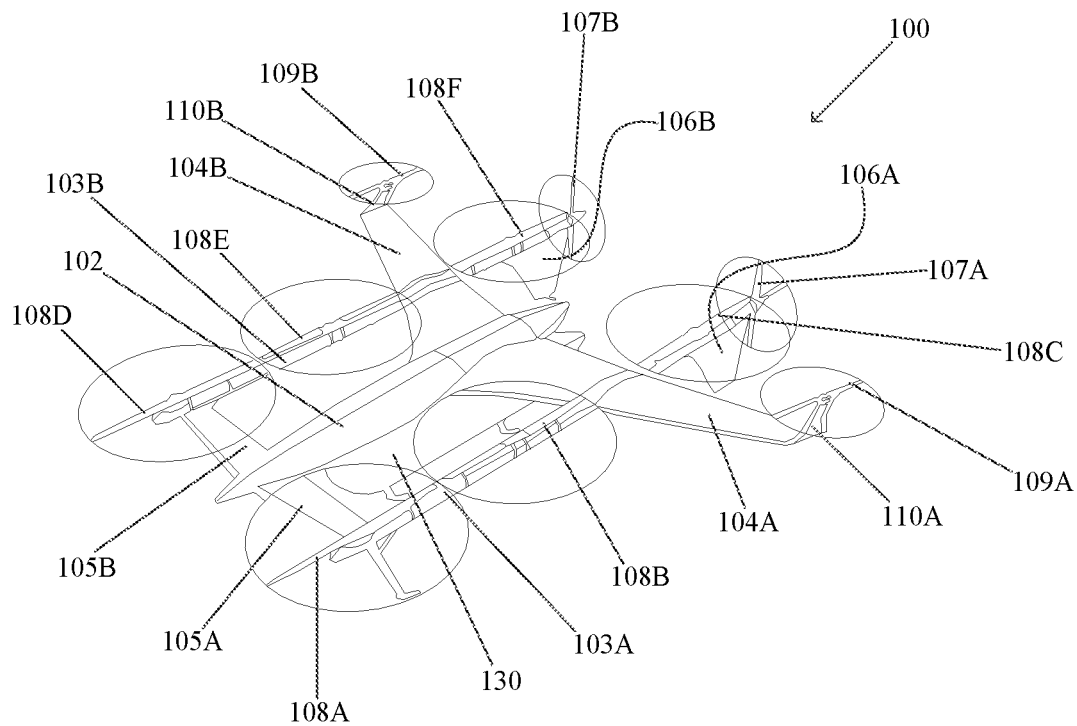
FIG. 1e is a top perspective drawing of an implementation mode of a VTOL unmanned aerial vehicle system according to yet another aspect of the implementation mode.
Figure 2:
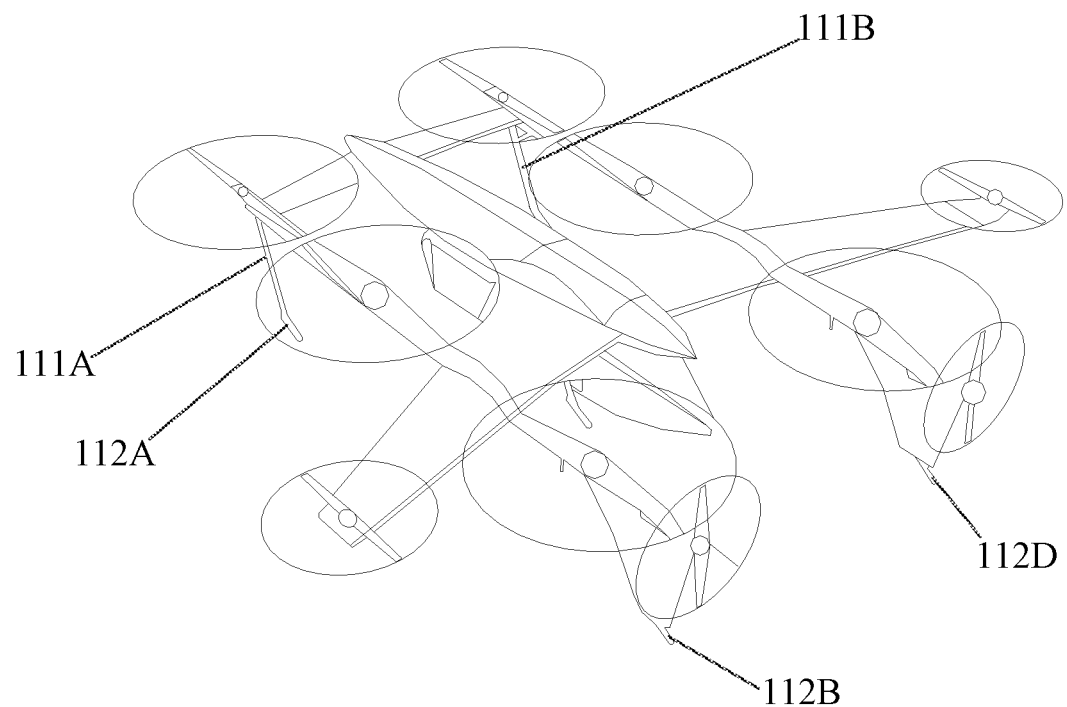
FIG. 2 is a top rear perspective drawing of the unmanned aerial vehicle system of FIG. 1e.
Figure 3:
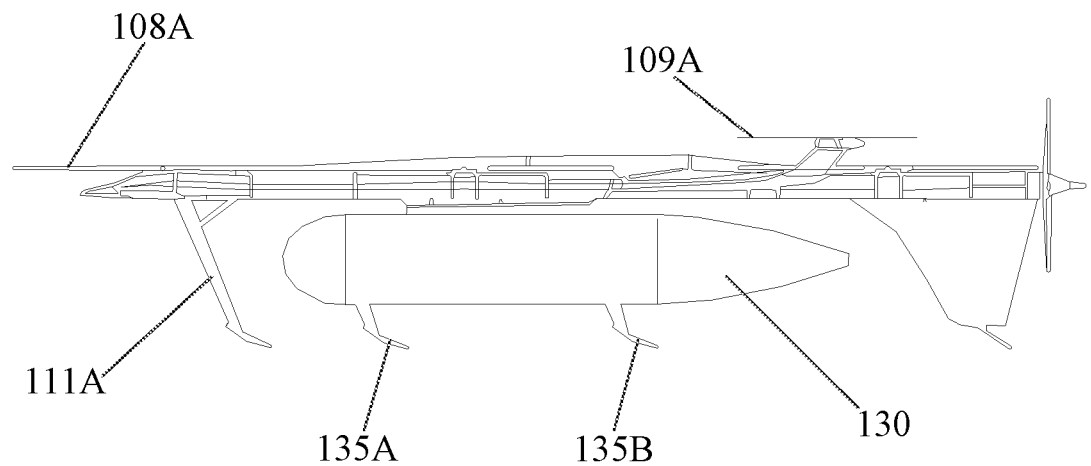
FIG. 3 is a side view of the unmanned aerial vehicle system of FIG. 1e.
Figure 4:
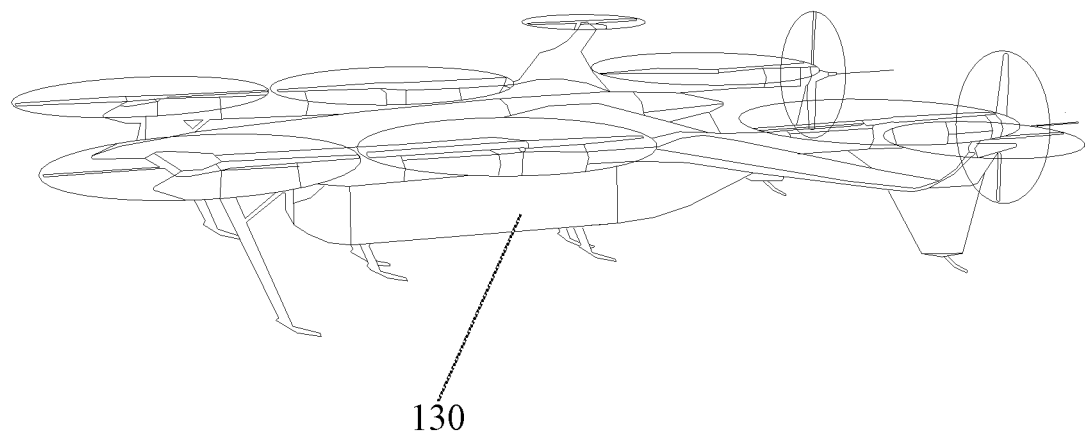
FIG. 4 is a top perspective drawing of another implementation mode of a VTOL unmanned aerial vehicle system having a flight platform and a detachably attached cabin according to one aspect of the implementation mode.
Figure 5:
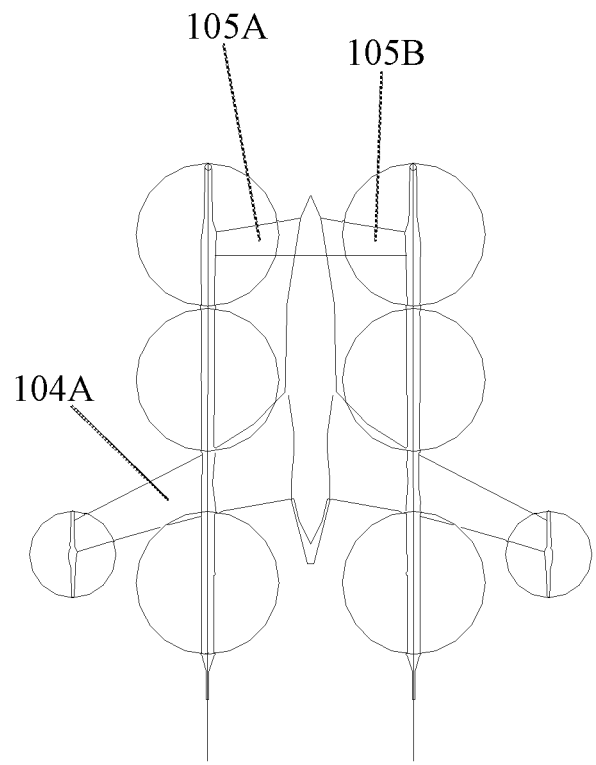
FIG. 5 is a top view of the unmanned aerial vehicle system of FIG. 4 according to one aspect of the implementation mode.
Figure 6:
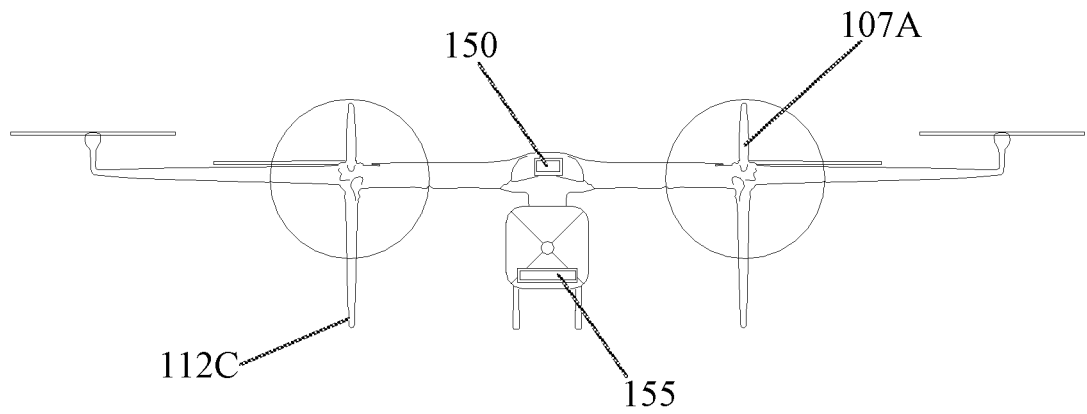
FIG. 6 is a front view of the unmanned aerial vehicle system of FIG. 4 according to one aspect of the implementation mode.
Figure 7:
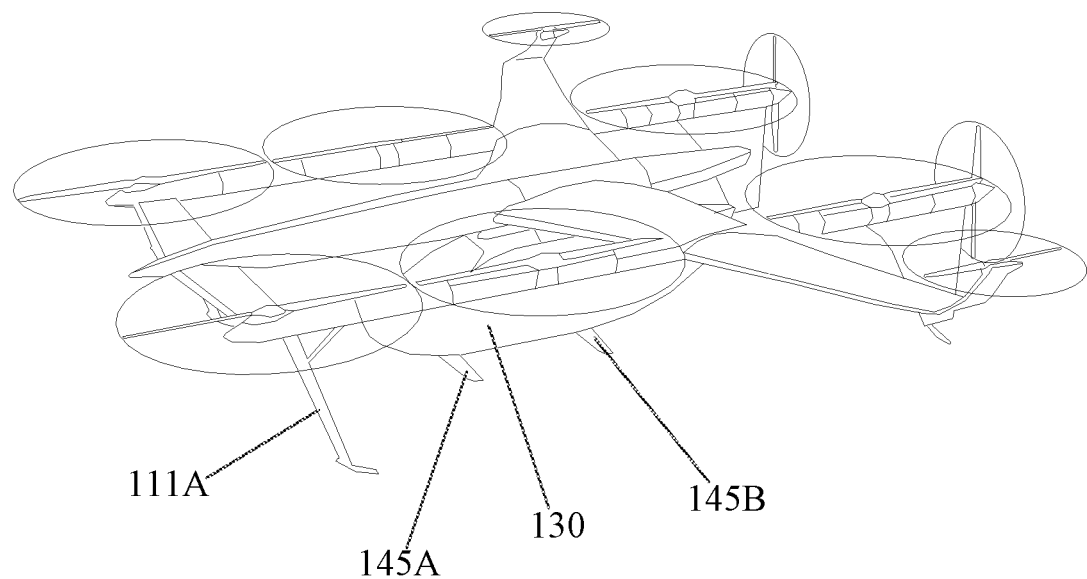
FIG. 7 is a top perspective drawing of an implementation mode of a VTOL unmanned aerial vehicle system having a flight platform and a detachably attached passenger cabin according to one aspect of the implementation mode.
Figure 8:
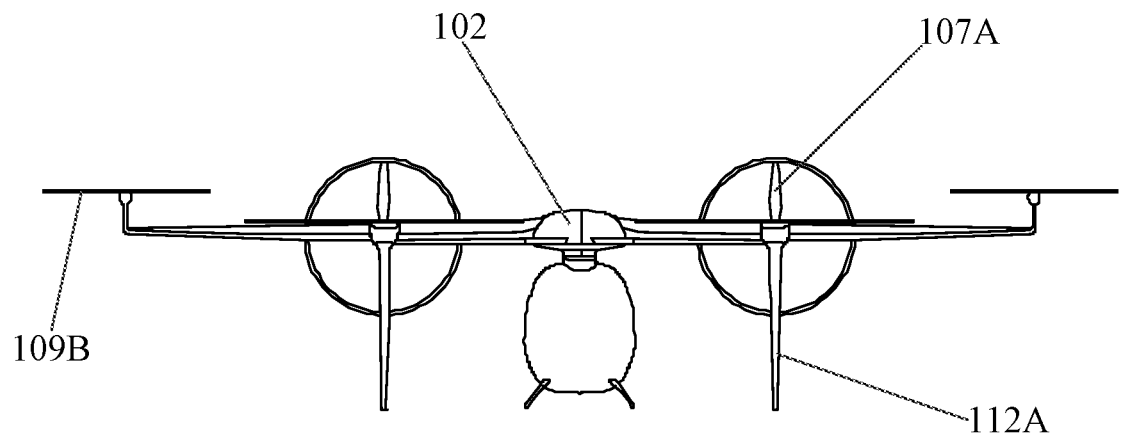
FIG. 8 is a front view of the unmanned aerial vehicle system of FIG. 7 according to one aspect of the implementation mode.
Figure 9:
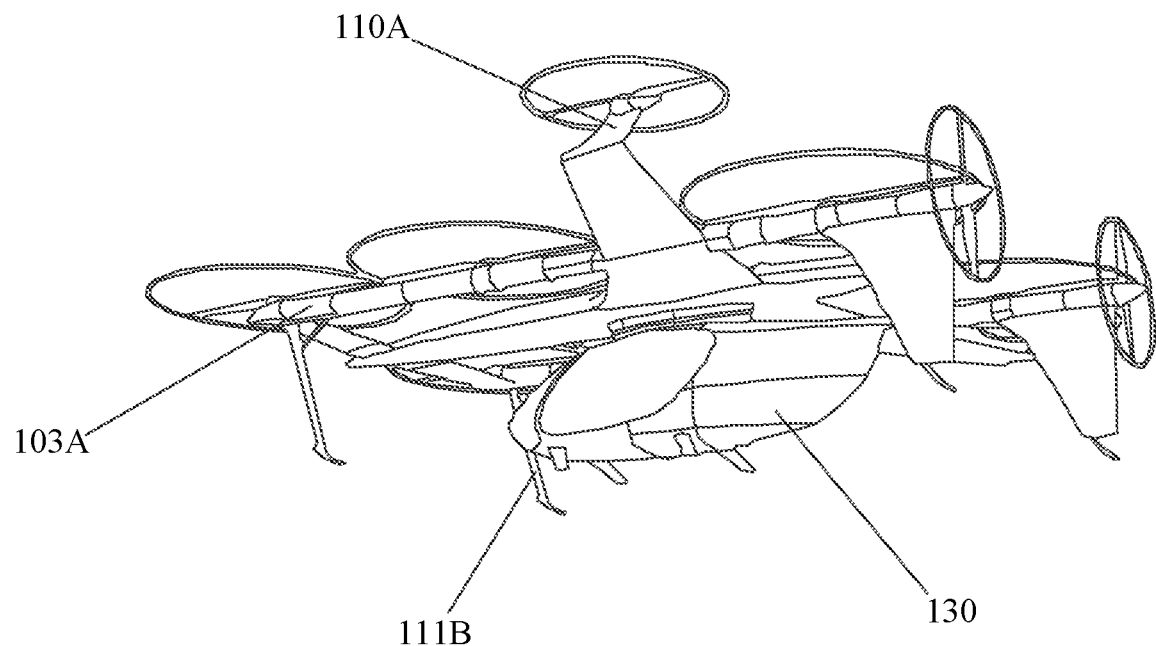
FIG. 9 is a rear perspective drawing of the unmanned aerial vehicle system of FIG. 7 according to one aspect of the implementation mode.
Figure 10:
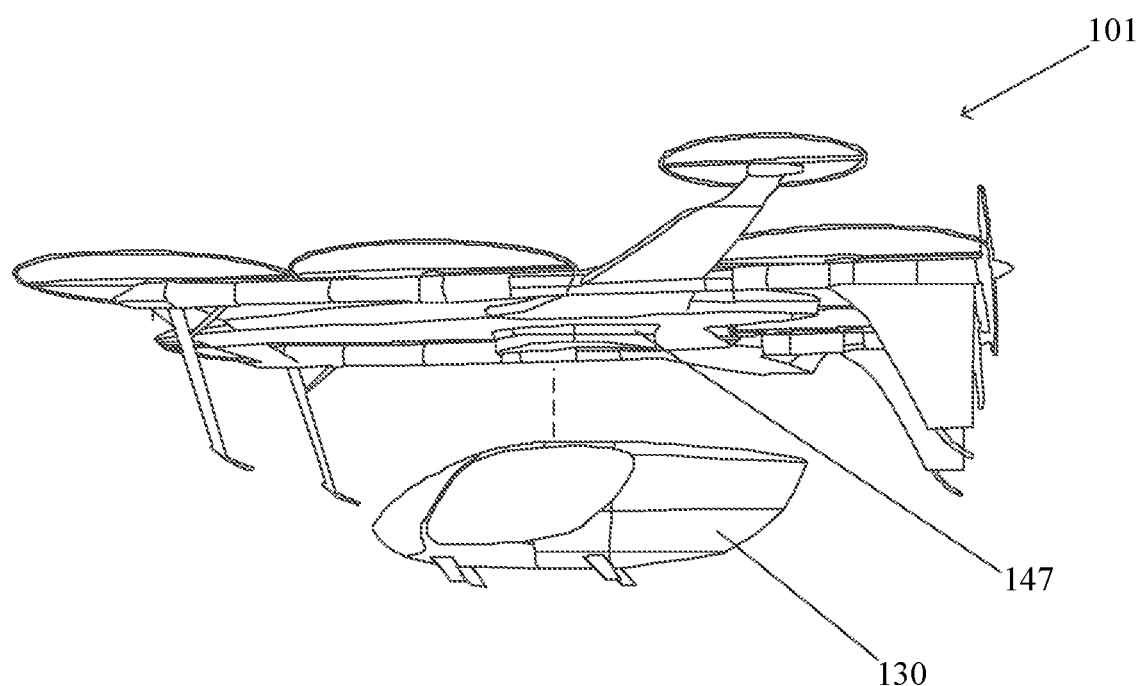
FIG. 10 is a side perspective drawing of the unmanned aerial vehicle system of FIG. 7 according to one aspect of the implementation mode, wherein the passenger cabin is separated from the flight platform and lands on the ground.
Figure 11:
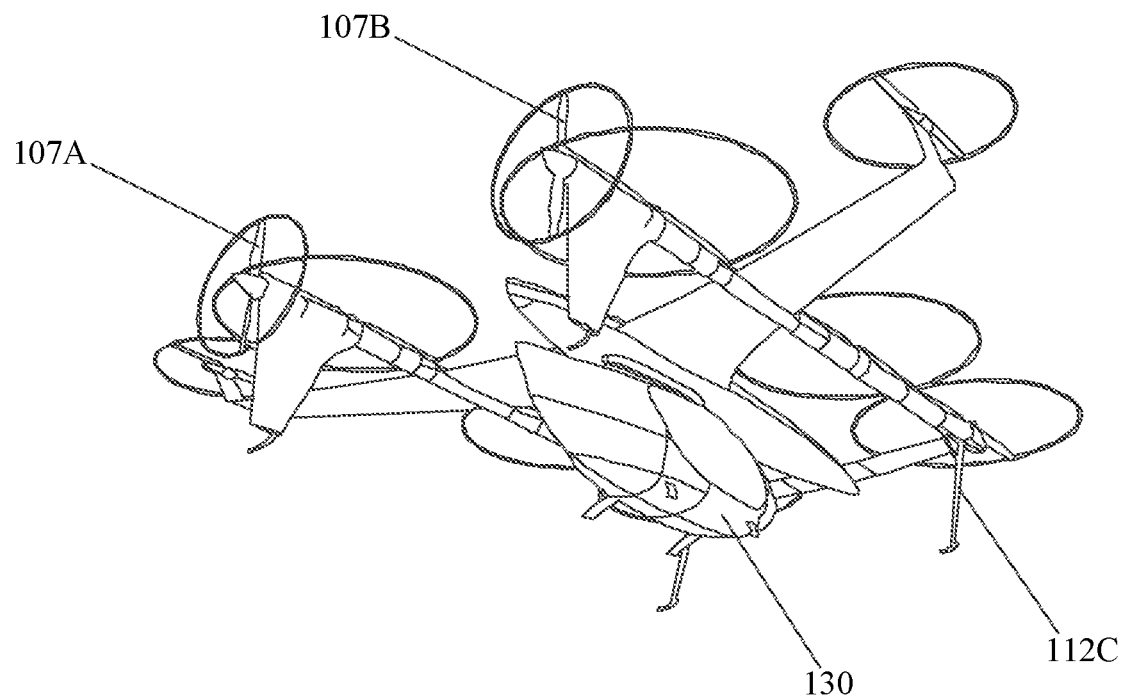
FIG. 11 is a rear perspective drawing of the implementation mode of FIG. 7 according to one aspect of the implementation mode.
Figure 12:
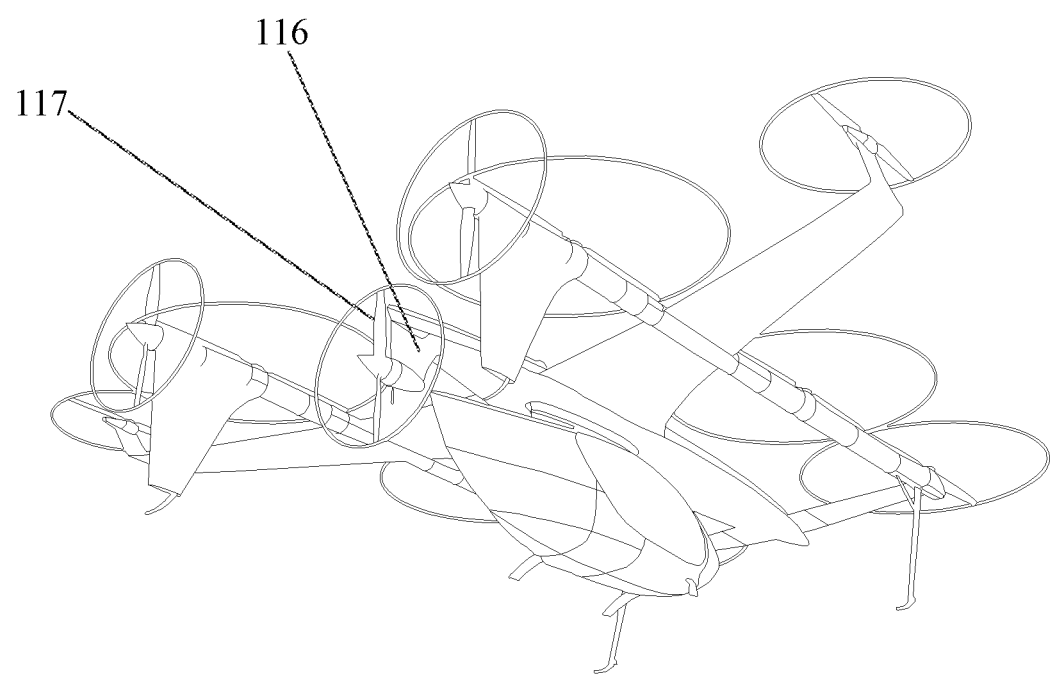
FIG. 12 is a rear perspective drawing of another implementation mode according to one aspect of the present disclosure.
Figure 13:
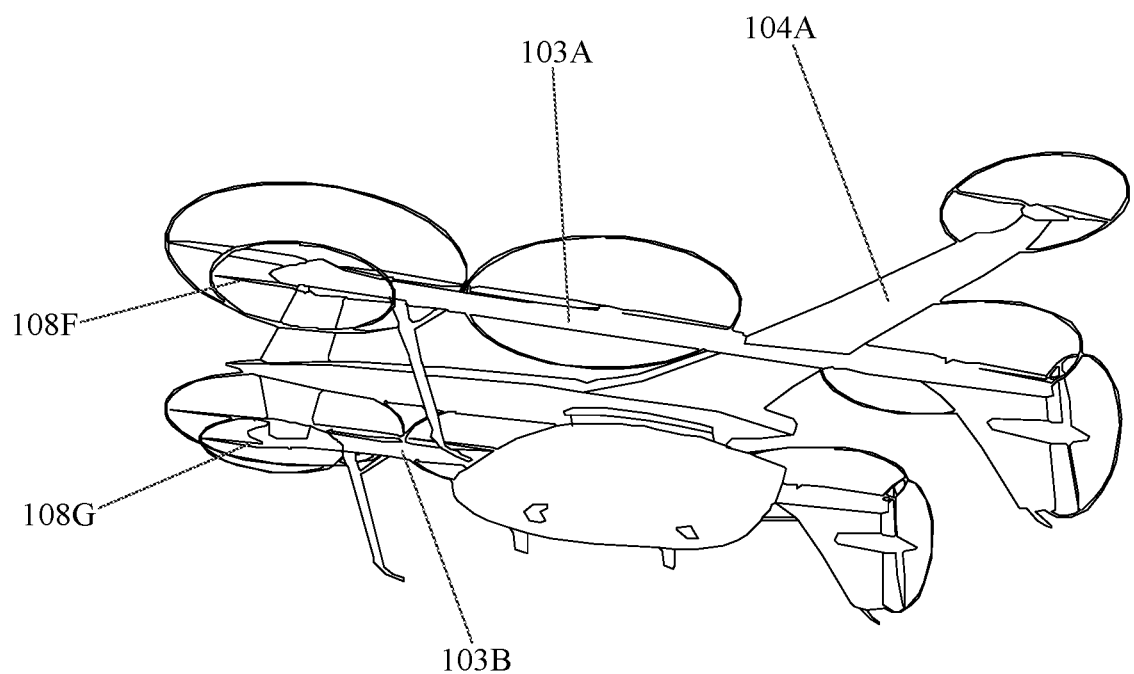
FIG. 13 is a side bottom perspective drawing of yet another implementation mode of the unmanned aerial vehicle system according to one aspect of the implementation mode.
Figure 14:
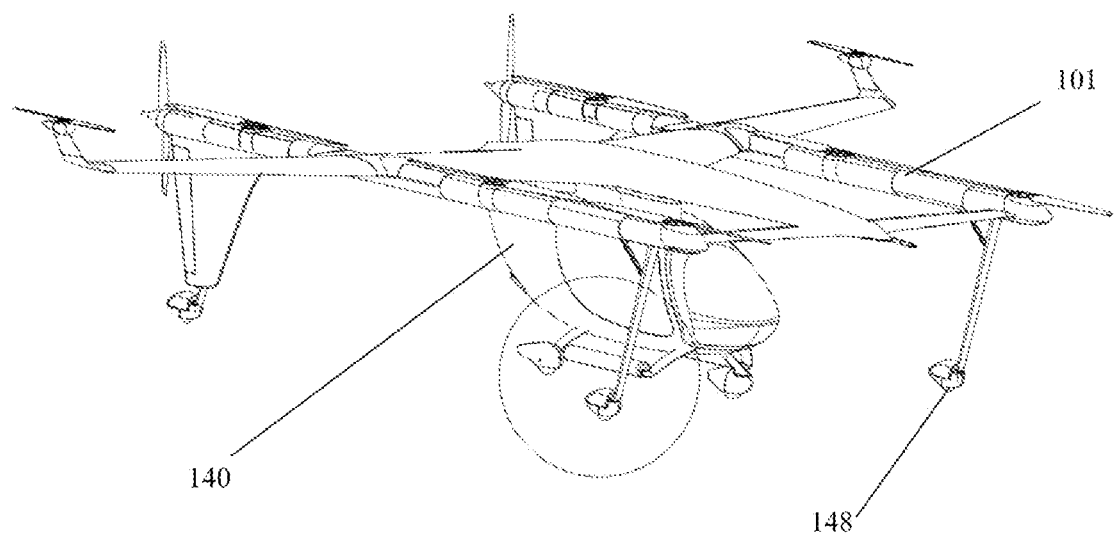
FIG. 14 is a perspective drawing of one implementation mode of an unmanned aerial vehicle system according to another aspect of the implementation mode.
Figure 15:
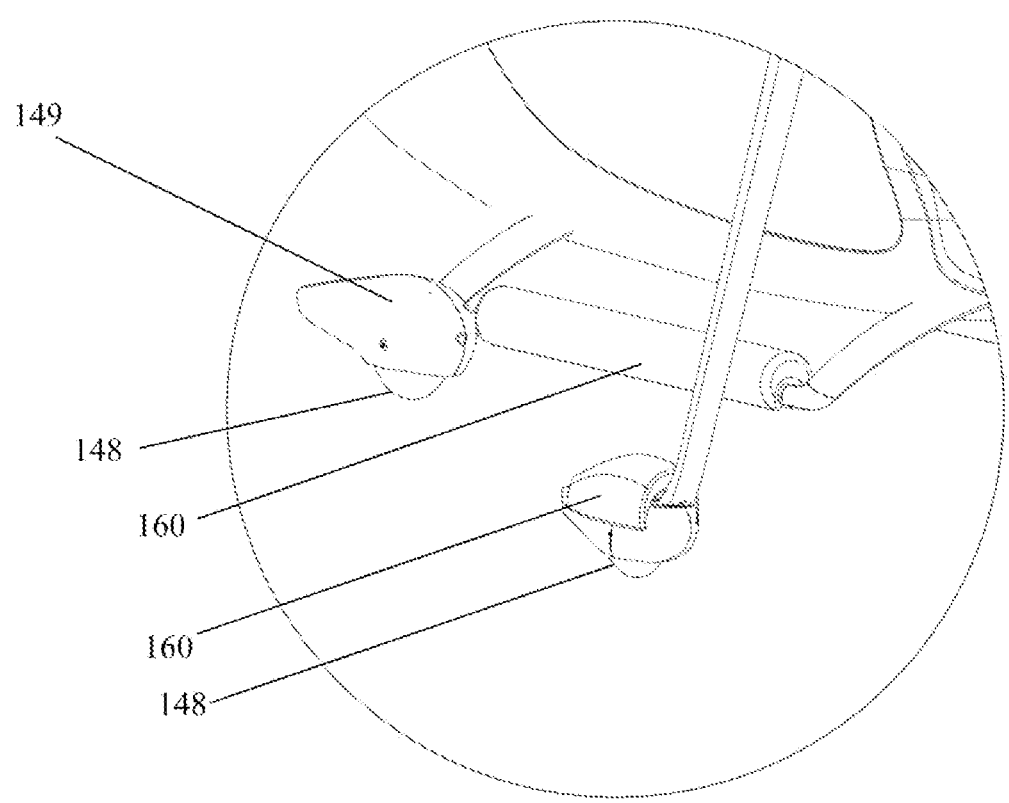
FIG. 15 is a close-up view of a surrounding region of FIG. 14 according to another aspect of the implementation mode.
Figure 16:
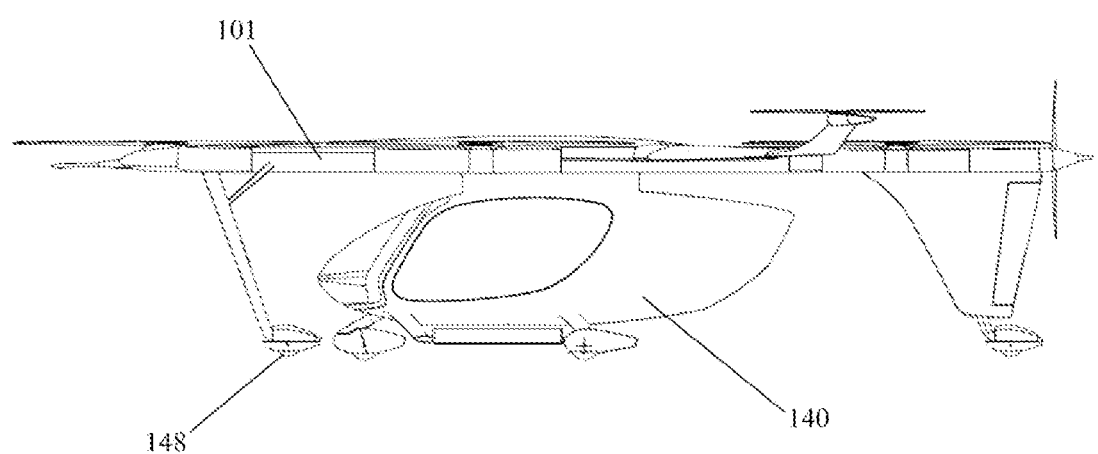
FIG. 16 is a side view of one implementation mode of an unmanned aerial vehicle system according to another aspect of the implementation mode.
Figure 17:
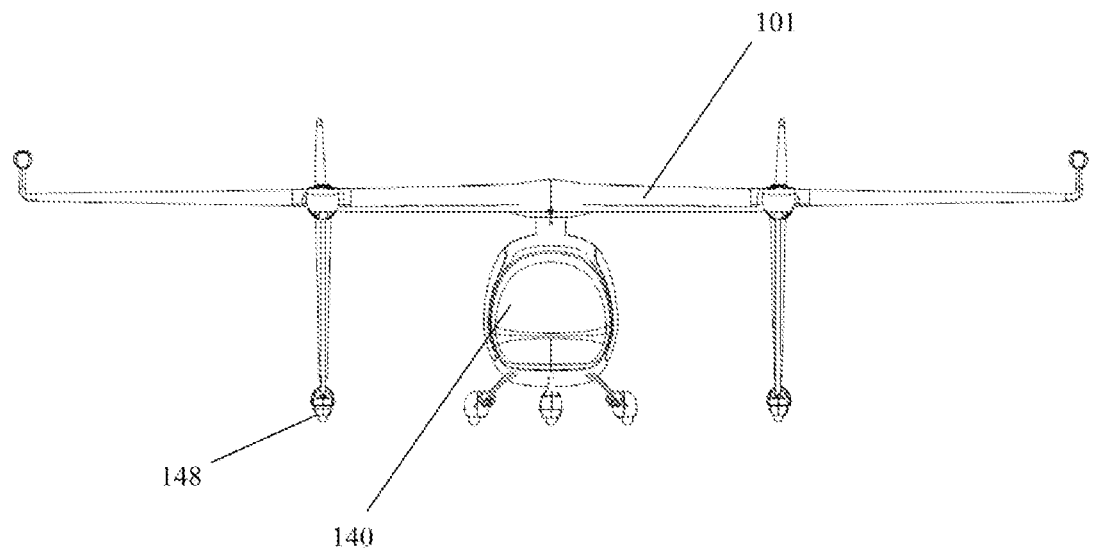
FIG. 17 is a front view of one implementation mode of an unmanned aerial vehicle system according to another aspect of the implementation mode.
Figure 18:
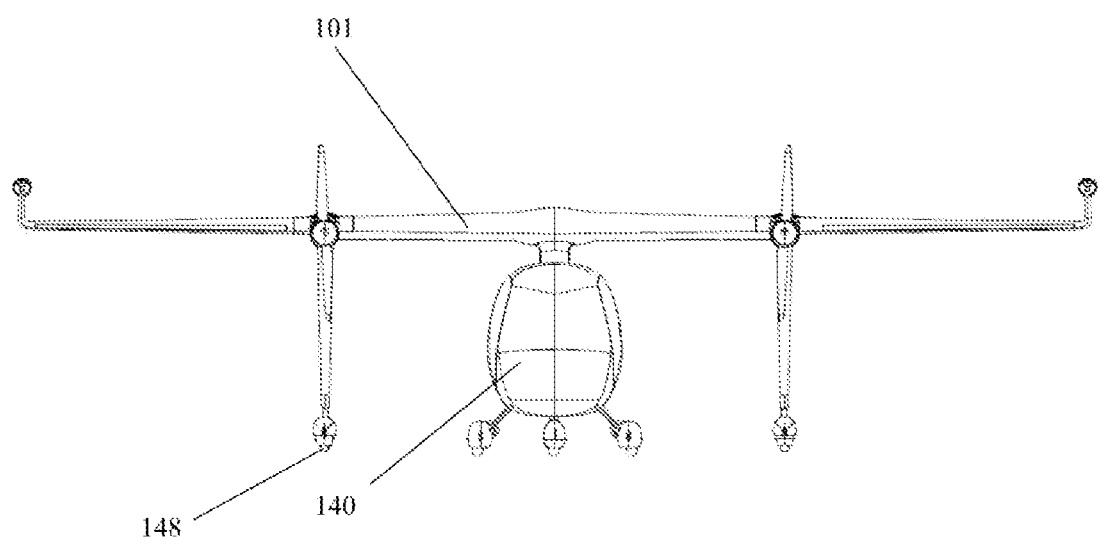
FIG. 18 is a rear view of one implementation mode of an unmanned aerial vehicle system according to another aspect of the implementation mode.
Figure 19:
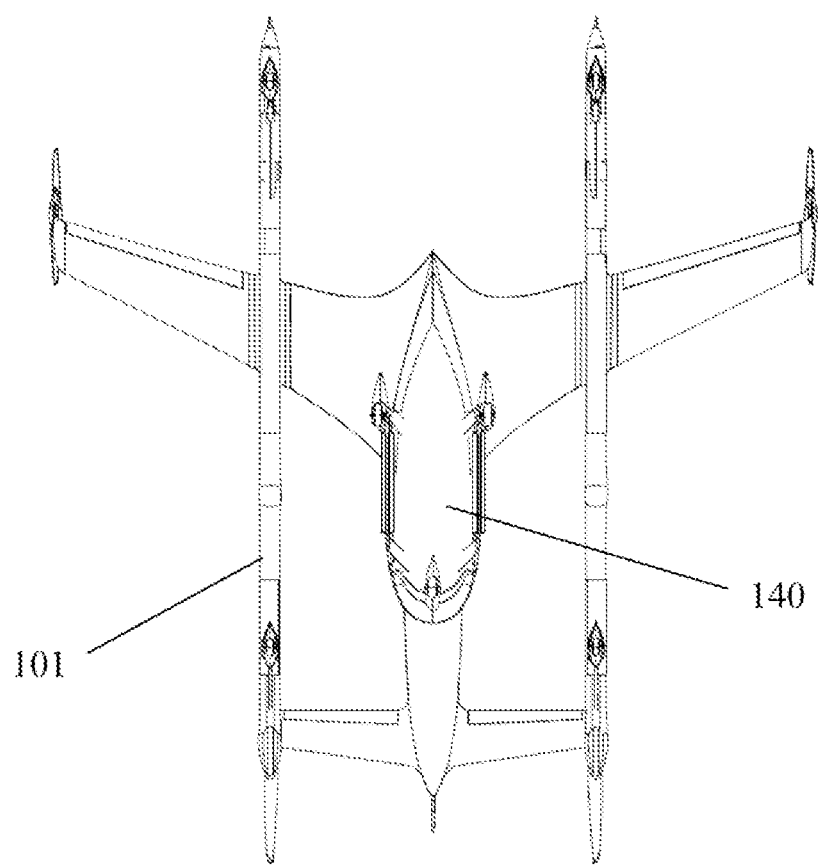
FIG. 19 is a bottom view of one implementation mode of an unmanned aerial vehicle system according to another aspect of the implementation mode.
Figure 20:
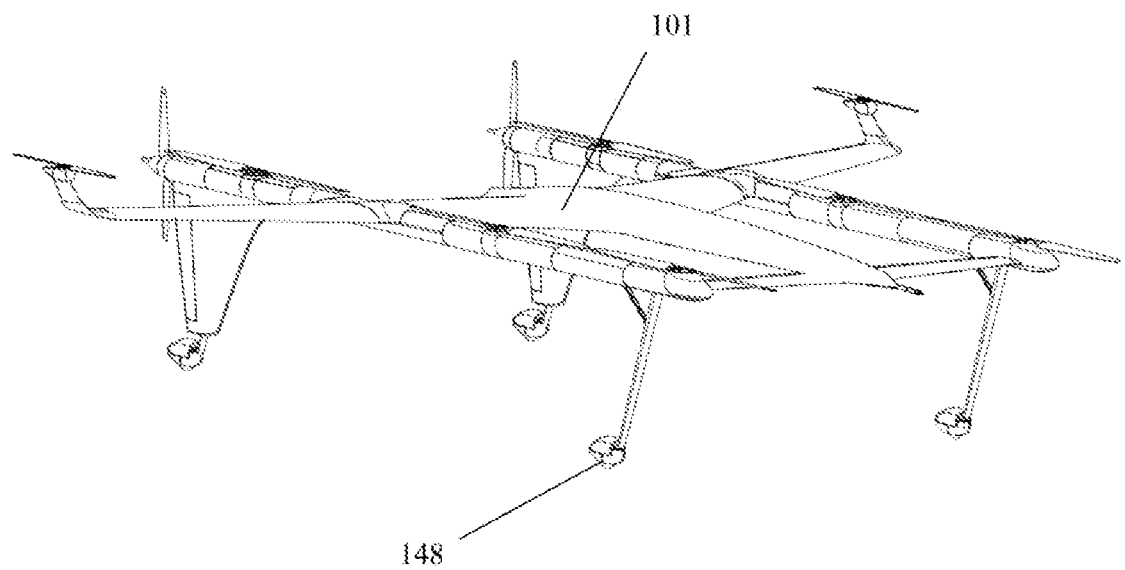
FIG. 20 is a perspective drawing of another implementation mode of a flight platform according to another aspect of the implementation mode.
Figure 21:
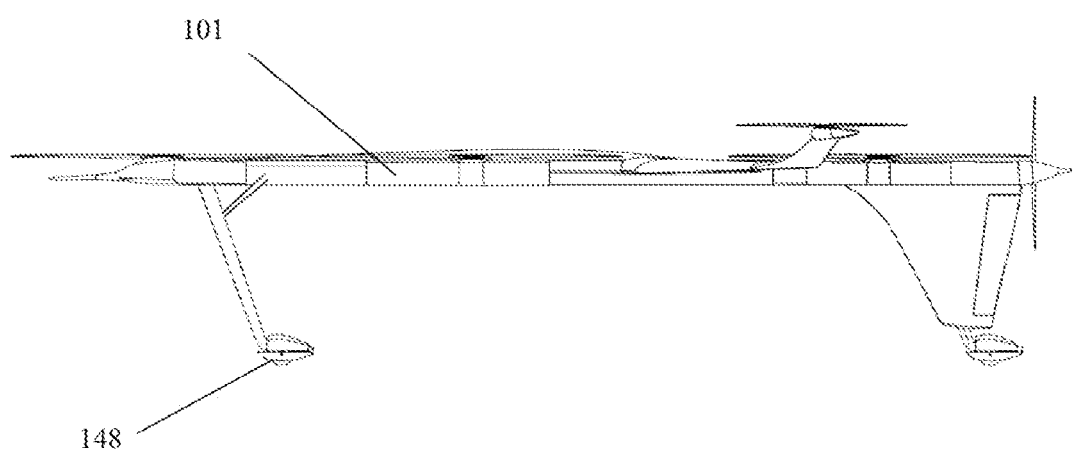
FIG. 21 is a side view of another implementation mode of a flight platform according to another aspect of the implementation mode.
Figure 22:
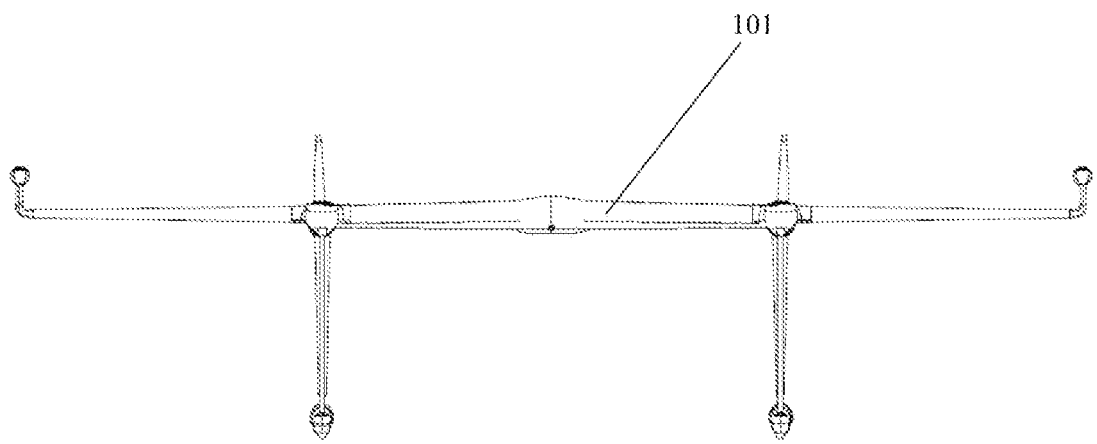
FIG. 22 is a front view of another implementation mode of a flight platform according to another aspect of the implementation mode.
Figure 23:
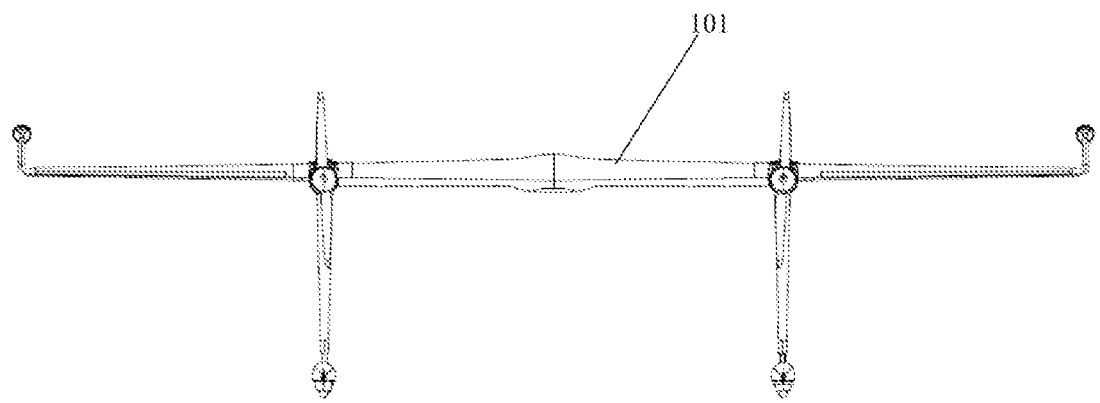
FIG. 23 is a rear view of another implementation mode of a flight platform according to another aspect of the implementation mode.
Figure 24:
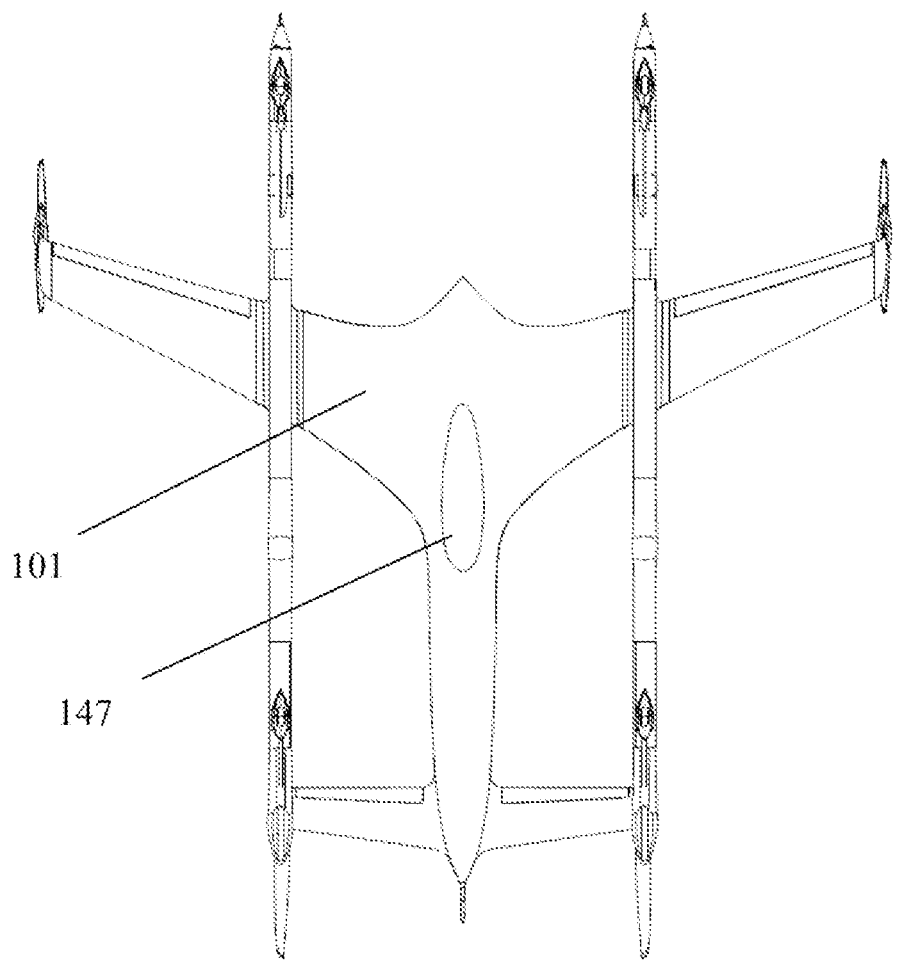
FIG. 24 is a bottom view of another implementation mode of a flight platform according to another aspect of the implementation mode.
Figure 25:
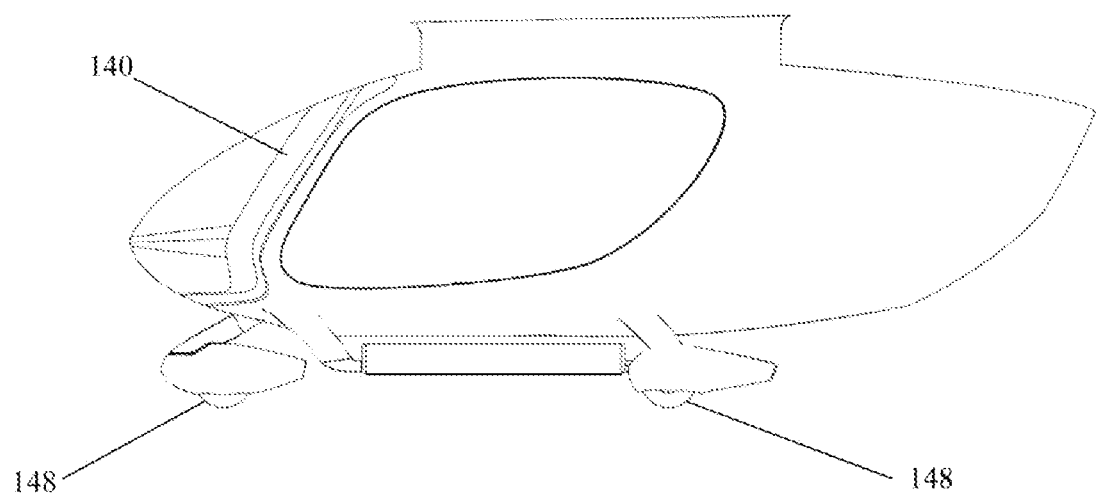
FIG. 25 is a side view of another implementation mode of a passenger cabin according to another aspect of the implementation mode.
Figure 26:
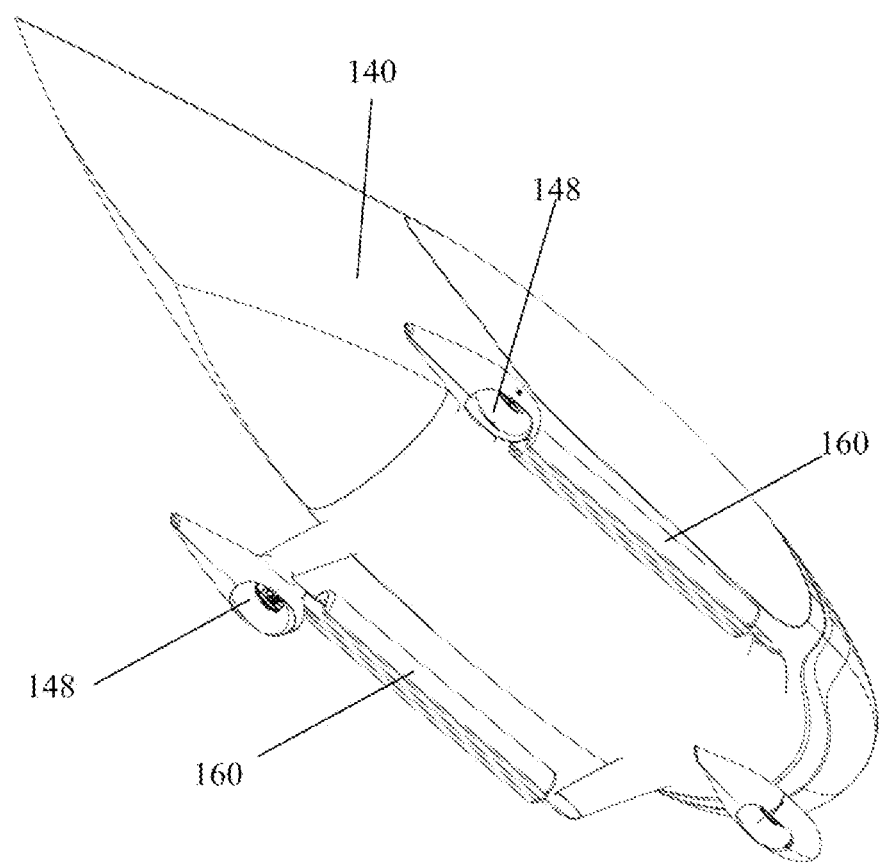
FIG. 26 is a bottom perspective drawing of another implementation mode of a passenger cabin according to another aspect of the implementation mode.
Figure 27:
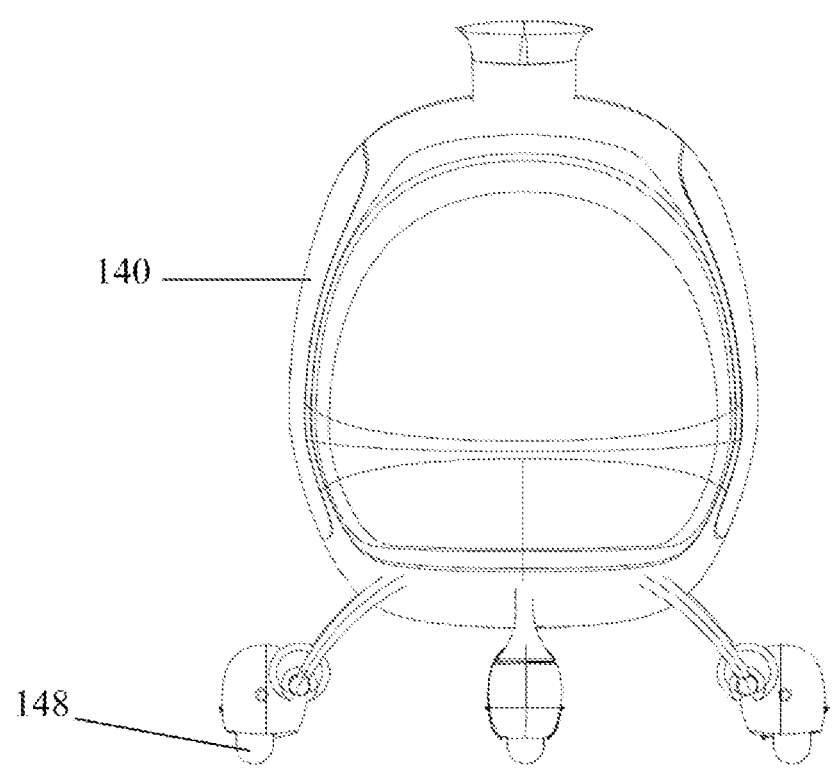
FIG. 27 is a front view of another implementation mode of a passenger cabin according to another aspect of the implementation mode.
Figure 28:
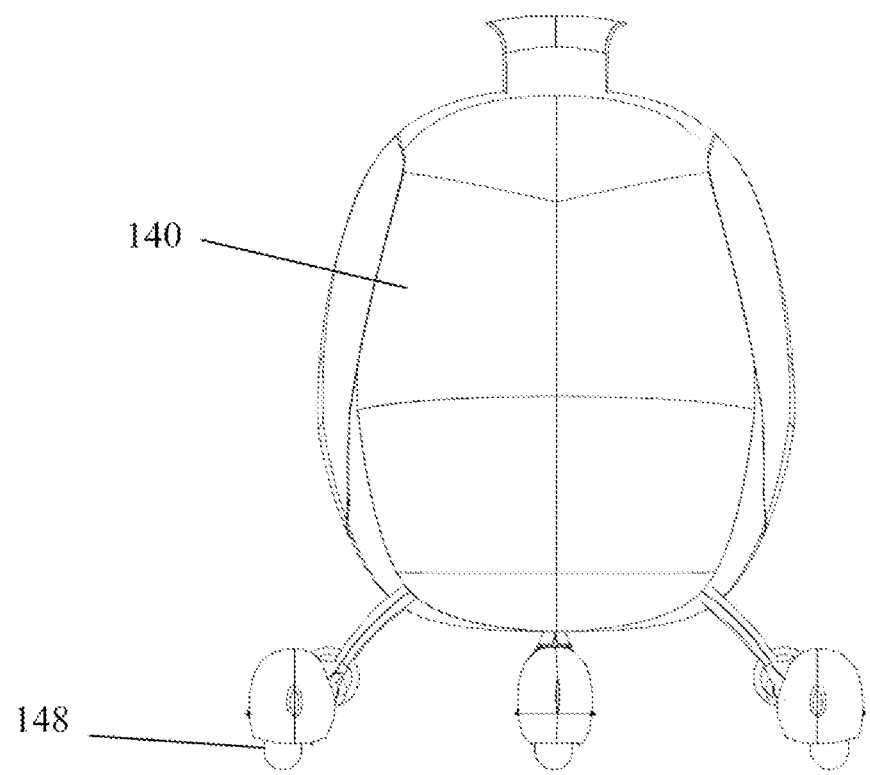
FIG. 28 is a rear view of another implementation mode of a passenger cabin according to another aspect of the implementation mode.
Figure 29:
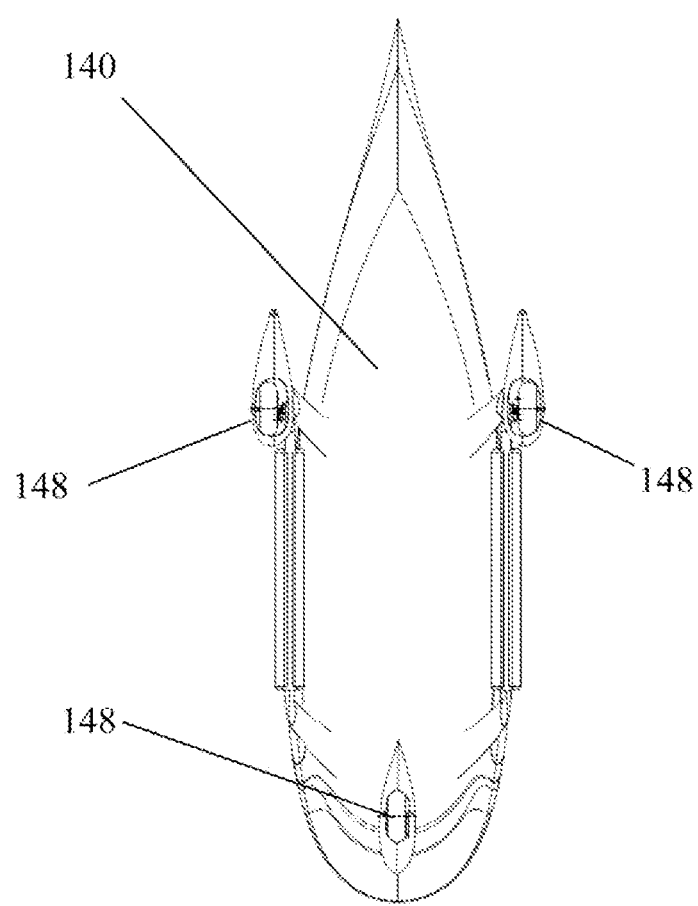
FIG. 29 is a bottom view of another implementation mode of a passenger cabin according to another aspect of the implementation mode.
Figure 30:
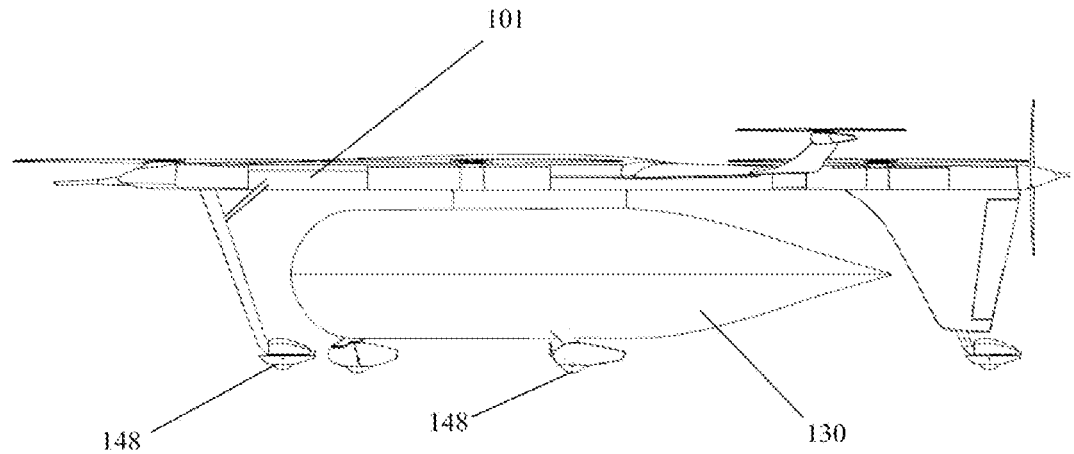
FIG. 30 is a side view of another implementation mode of a flight platform attached to a cargo space according to another aspect of the implementation mode.
Figure 31:
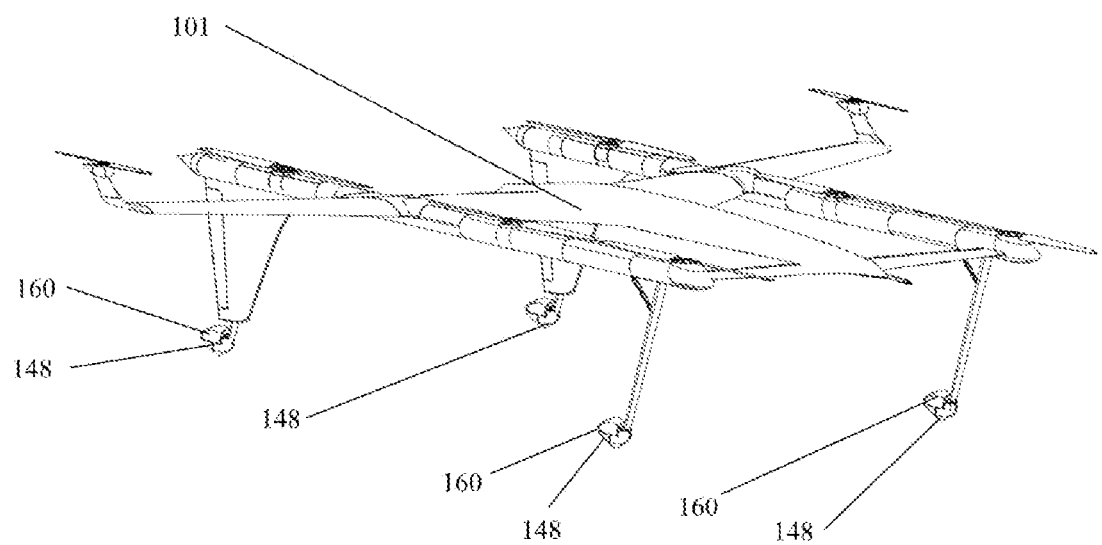
FIG. 31 is a perspective drawing of another implementation mode of a flight platform with no propulsion propeller according to another aspect of the implementation mode.
Figure 32:
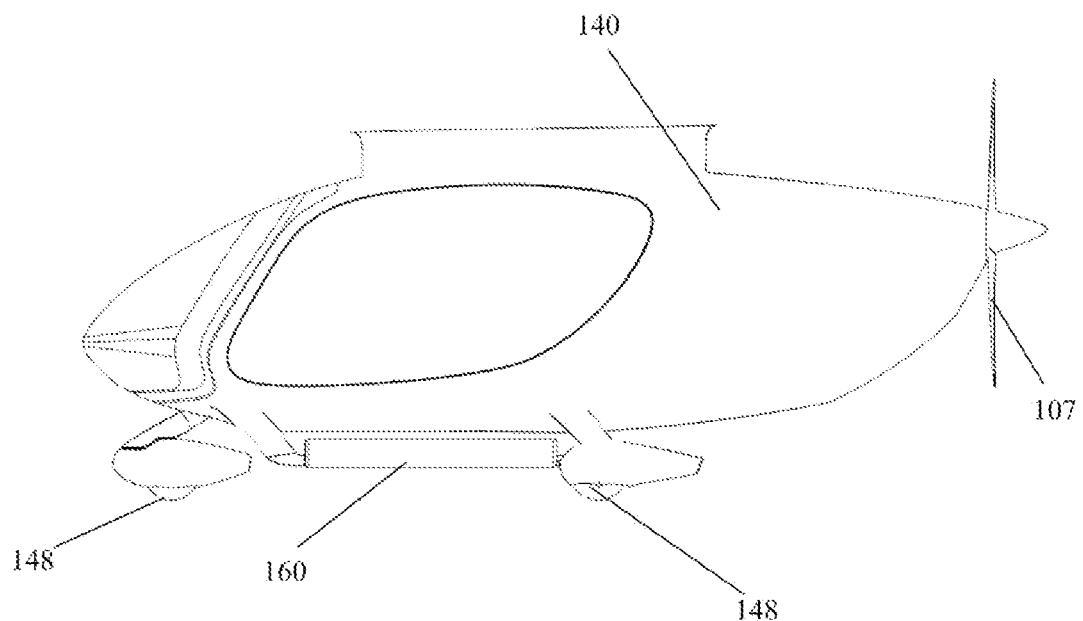
FIG. 32 is a side view of another implementation mode of a passenger cabin with a propulsion propeller according to another aspect of the implementation mode.
Figure 33:
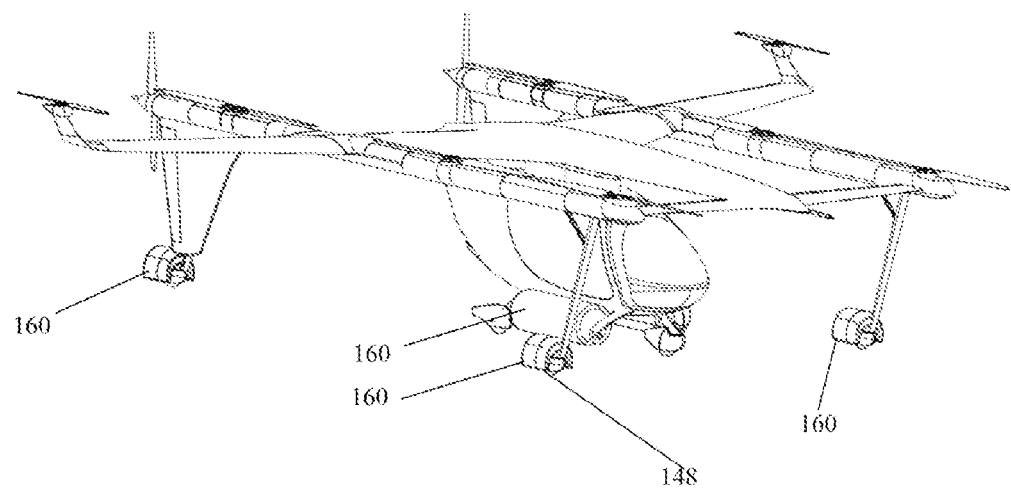
FIG. 33 is a perspective drawing of yet another implementation mode of a flight unmanned aerial vehicle system, wherein six floating devices are inflated.
Figure 34:
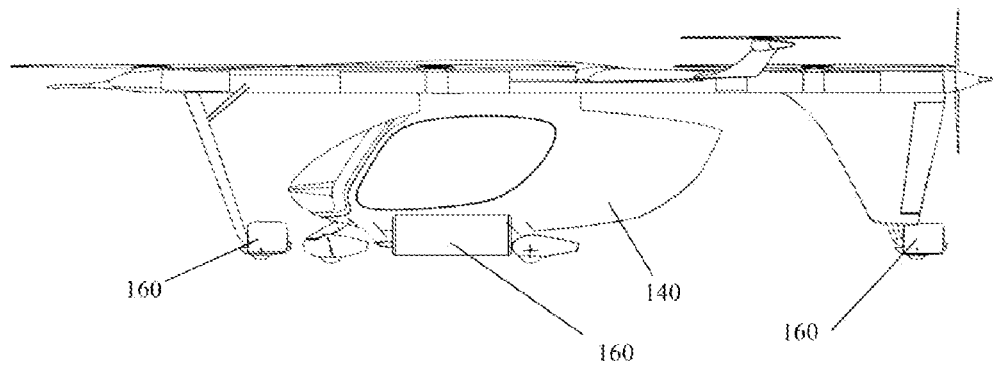
FIG. 34 is a side view of the flight unmanned aerial vehicle system of FIG. 33.
Figure 35:
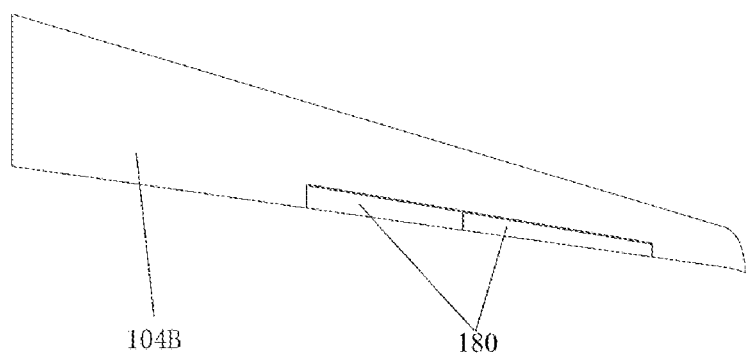
FIG. 35 is a drawing of configuration of an aileron of an illustrated unmanned aerial vehicle.

FIG. 1a is a top perspective drawing of an implementation mode of a VTOL unmanned aerial vehicle system according to one aspect of the implementation mode; FIG. 1b is a top perspective drawing of an implementation mode of a VTOL unmanned aerial vehicle system according to one aspect of the implementation mode; FIG. 1c is a front view of an implementation mode of a VTOL unmanned aerial vehicle system according to another aspect of the implementation mode; FIG. 1d is a partially enlarged diagram of FIG. 1c; FIG. 1e is a top perspective drawing of an implementation mode of a VTOL unmanned aerial vehicle system according to yet another aspect of the implementation mode; FIG. 2 is a top rear perspective drawing of the unmanned aerial vehicle system of FIG. 1e; FIG. 3 is a side view of the unmanned aerial vehicle system of FIG. 1e; FIG. 4 is a top perspective drawing of another implementation mode of a VTOL unmanned aerial vehicle system having a flight platform and a detachably attached cabin according to one aspect of the implementation mode; FIG. 5 is a top view of the unmanned aerial vehicle system of FIG. 4 according to one aspect of the implementation mode; FIG. 6 is a front view of the unmanned aerial vehicle system of FIG. 4 according to one aspect of the implementation mode; FIG. 7 is a top perspective drawing of an implementation mode of a VTOL unmanned aerial vehicle system having a flight platform and a detachably attached passenger cabin according to one aspect of the implementation mode; FIG. 8 is a front view of the unmanned aerial vehicle system of FIG. 7 according to one aspect of the implementation mode; FIG. 9 is a rear perspective drawing of the unmanned aerial vehicle system of FIG. 7 according to one aspect of the implementation mode; FIG. 10 is a side perspective drawing of the unmanned aerial vehicle system of FIG. 7 according to one aspect of the implementation mode, wherein the passenger cabin is separated from the flight platform and lands on the ground; FIG. 11 is a rear perspective drawing of the implementation mode of FIG. 7 according to one aspect of the implementation mode; FIG. 12 is a rear perspective drawing of another implementation mode according to one aspect of the present disclosure; FIG. 13 is a side bottom perspective drawing of yet another implementation mode of the unmanned aerial vehicle system according to one aspect of the implementation mode; FIG. 14 is a perspective drawing of one implementation mode of an unmanned aerial vehicle system according to another aspect of the implementation mode; FIG. 15 is a close-up view of a surrounding region of FIG. 14 according to another aspect of the implementation mode; FIG. 16 is a side view of one implementation mode of an unmanned aerial vehicle system according to another aspect of the implementation mode; FIG. 17 is a front view of one implementation mode of an unmanned aerial vehicle system according to another aspect of the implementation mode; FIG. 18 is a rear view of one implementation mode of an unmanned aerial vehicle system according to another aspect of the implementation mode; FIG. 19 is a bottom view of one implementation mode of an unmanned aerial vehicle system according to another aspect of the implementation mode; FIG. 20 is a perspective drawing of another implementation mode of a flight platform according to another aspect of the implementation mode; FIG. 21 is a side view of another implementation mode of a flight platform according to another aspect of the implementation mode; FIG. 22 is a front view of another implementation mode of a flight platform according to another aspect of the implementation mode; FIG. 23 is a rear view of another implementation mode of a flight platform according to another aspect of the implementation mode; FIG. 24 is a bottom view of another implementation mode of a flight platform according to another aspect of the implementation mode; FIG. 25 is a side view of another implementation mode of a passenger cabin according to another aspect of the implementation mode; FIG. 26 is a bottom perspective drawing of another implementation mode of a passenger cabin according to another aspect of the implementation mode; FIG. 27 is a front view of another implementation mode of a passenger cabin according to another aspect of the implementation mode; FIG. 28 is a rear view of another implementation mode of a passenger cabin according to another aspect of the implementation mode; FIG. 29 is a bottom view of another implementation mode of a passenger cabin according to another aspect of the implementation mode; FIG. 30 is a side view of another implementation mode of a flight platform attached to a cargo space according to another aspect of the implementation mode; FIG. 31 is a perspective drawing of another implementation mode of a flight platform with no propulsion propeller according to another aspect of the implementation mode; FIG. 32 is a side view of another implementation mode of a passenger cabin with a propulsion propeller according to another aspect of the implementation mode; FIG. 33 is a perspective drawing of yet another implementation mode of a flight unmanned aerial vehicle system, wherein six floating devices are inflated; FIG. 34 is a side view of the flight unmanned aerial vehicle system of FIG. 33; and FIG. 35 is a drawing of configuration of an aileron of an illustrated unmanned aerial vehicle.

FIG. 1a generally illustrates a drawing of an implementation mode of an unmanned aerial vehicle system having an inclined lift propeller. As shown in FIG. 1a, the unmanned aerial vehicle 100 at least includes: a main body 102; a left main wing 104A and a right main wing 104B which are respectively engaged with the main body 102; a left front wing 105A and a right front wing 105B which are respectively engaged with the main body 102; a left linear supporting piece 103A arranged on the left main wing 104A; a right linear supporting piece 103B arranged on the right main wing 104B; a first group of multiple lift propeller 108A, 108B, 108C arranged on the left linear supporting piece 103A; and a second group of multiple lift propellers 108D, 108E, 108F arranged on the right linear supporting piece 103B.

As shown in FIG. 1a, an outwards deflecting included angle less than 90 degrees is provided between a rotating shaft of each of the first group of multiple lift propellers and a plane in a lengthwise direction of the unmanned aerial vehicle 100. Those skilled in the art can understand that the plane in the lengthwise direction of the unmanned aerial vehicle 100 is the XZ plane in FIG. 1a. An included angle between the rotating shaft L1 of the lift propeller and L2 is θ. L2 is a straight line disposed on the XZ plane in a vertical direction. When θ is less than 90 degrees, a force generated by rotation of the lift propeller can be divided into a component in the vertical direction, i.e., a Z-axis direction and a component in a horizontal direction, i.e., a Y-axis direction. Correspondingly, an outwards deflecting included angle less than 90 degrees is provided between a rotating shaft of each of the second group of multiple lift propellers and the plane in the lengthwise direction of the unmanned aerial vehicle 100. It should be noted that the included angles between two opposite lift propellers in an X-axis direction and the XZ plane are the same. Therefore, it is ensured that the rotating speeds of the lift propellers above the left linear supporting piece 103A and the right linear supporting piece 103B are the same, and the unmanned aerial vehicle 100 will not yaw.

It is easily understood that θ is less than 90 degrees, so that a force generated by the rotation of the lift propeller can be divided into a component in the vertical direction and a component in the horizontal direction. The component in the vertical direction is used for vertical takeoff and landing of the unmanned aerial vehicle 100. When the rotating speeds of the opposite lift propellers on the left linear supporting piece 103A and the right linear supporting piece 103B are the same, the horizontal components generated by the lift propellers cancel each other out. When there is a rotating speed difference between the opposite lift propellers on the left linear supporting piece 103A and the right linear supporting piece 103B, the horizontal components generated by the lift propellers are used for increasing the yawing moment, thereby improving the heading axis control capacity, and the unmanned aerial vehicle 100 can be steered faster.

Preferably, a rotating shaft of each lift propeller from among the first group of multiple lift propellers 108A, 108B, 108C, and the second group of multiple lift propellers 108D, 108E, 108F outwards forms an angle of 5 degrees to 15 degrees relative to a vertical plane of the unmanned aerial vehicle perpendicular to a horizontal plane of the unmanned aerial vehicle. Those skilled in the art can understand that θ is set within a range of 5 to 15 degrees. Compared with the existing art, the vertical component decreases, i.e., loss of a lift force is relatively low, when the lift propeller rotates. It can also be ensured that the yawing moment increases. For example, θ is set within the range of 5 to 15 degrees, causing that the lift force loss is 0.5 to 3%, and the yawing moment is increased by 8 to 20%. If θ is set to be 8 degrees, the lift force loss is 0.97%, and the yawing moment is increased by 13.92%.

One possible realizing mode is that the included angles between two adjacent lift propellers in the first group of multiple lift propellers and the plane in the lengthwise direction of the unmanned aerial vehicle 100 are different, i.e., the included angles between two adjacent lift propellers at the top of the left linear supporting piece 103A and the XZ plane are different. For example, in a negative direction of the X axis, the included angle between the rotating shaft of the first lift propeller and the XZ plane is 5 degrees, and the included angle of the second lift propeller is 10 degrees, and the included angle of the third lift propeller is 15 degrees. Those skilled in the art can understand that the included angles between two adjacent lift propellers at the tops of the linear supporting pieces and the XZ plane are different. In case that the length of the left linear supporting piece 103A does not change, interference between adjacent lift propellers can be reduced, i.e., the structure of the unmanned aerial vehicle 100 is more compact. It is easily thought that the included angles between two adjacent lift propellers from among the second group of multiple lift propellers and the plane in the lengthwise direction of the unmanned aerial vehicle 100 are different. In case that the length of the right linear supporting piece 103B does not change, interference between adjacent lift propellers can be reduced, i.e., the structure of the unmanned aerial vehicle 100 is more compact.

By the adoption of the unmanned aerial vehicle of the present disclosure, by means of setting the rotating shaft of each of the multiple lift propellers to outward form a certain angle θ (5 degrees to 15 degrees) relative to the vertical plane of the unmanned aerial vehicle perpendicular to the horizontal plane of the unmanned aerial vehicle, the heading axis control capacity of the unmanned aerial vehicle is improved, and the restriction to the design size of the unmanned aerial vehicle is reduced.

FIG. 1b is a front view of an implementation mode of a VTOL unmanned aerial vehicle system according to another aspect of the implementation mode. The unmanned aerial vehicle further includes a left tail fin 191A and a right tail fin 191B. The left tail fin 191A is arranged on the upper side of the tail end of the left linear supporting piece 103A; the right tail fin 191B is arranged on the upper side of the tail end of the right linear supporting piece 103B; and a left additional lift propeller 170A and a right additional lift propeller 170B are respectively arranged at the top ends of the left and right tail fins 191A and 191B. By means of disposing the additional lift propellers on the left and right tail fins, the overall structure is more compact, and the structural weight is reduced, so that the cruising power is reduced, and the endurance is increased. The rotating shaft L3 of the left additional lift propeller 170A outwards forms an angle of 5 degrees to 15 degrees relative to the vertical plane of the unmanned aerial vehicle perpendicular to the horizontal plane of the unmanned aerial vehicle, and the rotating shaft of the left additional lift propeller 170B also outwards forms an angle of 5 degrees to 15 degrees relative to the vertical plane of the unmanned aerial vehicle perpendicular to the horizontal plane of the unmanned aerial vehicle.

In one implementation mode, as shown in FIG. 1a, FIG. 1c, and FIG. 1d, the front and rear end parts of the main body 102 of the unmanned aerial vehicle are respectively provided with a propulsion propeller 107 and a traction propeller 192. By means of pushing a motor by front and rear power, the power of the unmanned aerial vehicle is increased.

In one implementation mode, the left tail fin 191A of the unmanned aerial vehicle can be arranged at a position where the left main wing and the left supporting piece are engaged with each other, and the right tail fin 191B can be arranged at a position where the right main wing and the right supporting piece are engaged with each other. At this position, bases of the left and right tail fins can respectively at least overlap the left main wing and the right main wing, and each of a left back fin and a right back fin has a backward inclined surface. The left additional lift propeller 170A and the right additional lift propeller 170B are respectively arranged at the top ends of the left and right tail fins 191A and 191B.

FIG. 1e broadly illustrates an implementation mode of a VTOL unmanned aerial vehicle 100 with a front wing configuration.

The unmanned aerial vehicles shown in the drawings have partially same structural configurations. Features of components of the unmanned aerial vehicles can be freely combined and configured, and the drawings are only exemplary.

The unmanned aerial vehicle 100 shown in FIG. 1e may have two main wings 104A and 104B serving as the left main wing and the right main wing, and two front wings serving as the left front wing 105A and the right front wing 105B. The two main wings 104A and 104B and the two front wings 105A and 105B can be attached to the main body 102 which can be positioned along a center longitudinal line of the unmanned aerial vehicle 100. There can also be a left linear supporting piece 103A parallel to the main body 102, and the left main wing 104A can be connected to the left front wing 105A. Similarly, there can also be a right linear supporting piece 103B parallel to the main body 102, and the right main wing 104B can be connected to the right front wing 105B. The front wings of the unmanned aerial vehicle mainly control a flight attitude of the aerial vehicle in a flight, such as, controls pitching of the aerial vehicle. As the biggest wings on both sides of the airframe, the main wings of the unmanned aerial vehicles are usually for generating a lift force to support the flight of the aerial vehicle in the air and also play a certain role of stabilization and control.

In one implementation mode, the unmanned aerial vehicle 100 can also have no front wing configuration. For example, the unmanned aerial vehicle 100 can have two main wings serving as a left main wing and a right main wing, and two ailerons serving as a left aileron and a right aileron. All these wings are engaged together to form a flight platform.

In one implementation mode, as shown in FIG. 35, the ailerons 180 of the unmanned aerial vehicle can be arranged on the rear side of the main wing 104B. There can be at least one, preferably two, sheet-like aileron that can move up and down to control the aerial vehicle to roll over.

The left and right linear supporting pieces 103A and 103B are expected to improve the structural integrity of the unmanned aerial vehicle 100. In other implementation modes, the left and right linear supporting pieces 103A and 103B can accommodate a driving motor (not shown) for driving each lift propeller 108A, 108B, 108C, 108D, 108E, or 108F. Therefore, the left and right linear supporting piece 103A and 103B can be used to fix the lift propellers, and use of unmanned aerial vehicle components is reduced. When the structural components of the unmanned aerial vehicles are reduced, since the left and right linear supporting pieces 103A and 103B are engaged with the two front wings and the two main wings, the overall intensity of the unmanned aerial vehicle can also be enhanced. As will be disclosed later, the left and right linear supporting pieces 103A and 103B can also accommodate folding legs 111, and each folding leg can be collected into the left and right linear supporting pieces 103A and 103B.

In one implementation mode, the left and right linear supporting pieces 103A and 103B are respectively attached to the far ends of the left and right front wings 105A and 105B. In another implementation mode, the left and right linear supporting pieces 103A and 103B extend out of the front wings 105A and 105B.

In one implementation mode, the left and right linear supporting pieces 103A and 103B are respectively attached to positions near the middle parts of the left and right main wings 104A and 104B. In yet another implementation mode, the left and right linear supporting pieces 103A and 103B extend out of the main wings 104A and 104B.

The left linear supporting piece 103A is expected to be relatively narrow in a diameter, and may have the first group of multiple lift propellers 108A, 108B, 108C arranged on the top side, the bottom side or both the top side and the bottom side of the left linear supporting piece 103A. In one feasible implementation mode, these lift propellers 108A, 108B, 108C may be driven by a low-profile motor arranged in a hollow inside of the left linear supporting piece 103A. In the implementation mode shown in FIG. 1e, the lift propellers 108A, 108B, 108C are only arranged on the top side of the left linear supporting piece 103A. It should be noted that the quantity of the lift propellers shown in the figures are only for illustration. The present disclosure does not limit the quantity. In practice, the lift propellers can be increased and decreased according to a need. Similarly, the right linear supporting piece 103B is expected to be relatively narrow in a diameter, and may have the second group of multiple lift propellers 108D, 108E, 108F arranged on the top side, the bottom side or both the top side and the bottom side of the right linear supporting piece 103B. In one feasible implementation mode, these lift propellers 108D, 108E, 108F may be driven by a low-profile motor arranged in a hollow inside of the right linear supporting piece. In the implementation mode shown in FIG. 1e, the lift propellers 108D, 108E, 108F are only arranged on the top side of the right linear supporting piece 103B. It should be noted that the quantity of the lift propellers shown in the figures are only for illustration. The present disclosure does not limit the quantity. In practice, the quantity of the lift propellers can be increased and decreased according to a need.

As shown in FIG. 1a-FIG. 1d, the rotating shaft of each lift propeller from among the first group of multiple lift propellers 108A, 108B, 108C, and the second group of multiple lift propellers 108D, 108E, 108F outwards forms the angle of 5 degrees to 15 degrees relative to the vertical plane of the unmanned aerial vehicle perpendicular to the horizontal plane of the unmanned aerial vehicle. It should be noted that FIG. 1c and FIG. 1d only illustrate the lift propellers 108A and 108D, and other lift propellers can be set by referring to the above two lift propellers. The dotted line in FIG. 1a-FIG. 1d represents the included angle between the vertical plane of the unmanned aerial vehicle and the rotating shaft of the lift propeller. It can be seen that the rotating shaft of the lift propeller and the vertical plane of the unmanned aerial vehicle form a certain acute angle θ. For example, the angle ranges between 5 degrees and 15 degrees.

In one embodiment, the unmanned aerial vehicle 100 further includes a left vertical stabilizer 106B arranged at the rear part of the left linear supporting piece 103A and a right vertical stabilizer 106B arranged at the rear part of the right linear supporting piece 103B. Although they are shown pointing down, there can also be implementation modes in which they point up. The vertical stabilizer is used to keep the stability of the unmanned aerial vehicle at the flight stage.

In one embodiment, the unmanned aerial vehicle 100 further includes a left additional lift propeller 170A arranged on a top terminal of the left vertical stabilizer 106A and a right additional lift propeller 170B arranged on a top terminal of the right vertical stabilizer 106B. The left and right additional lift propellers increase the lift force of the unmanned aerial vehicle.

In one embodiment, a rotating shaft of each of the left additional lift propeller and the right additional lift propeller outwards forms an angle of 5 degrees to 15 degrees relative to a vertical plane of the unmanned aerial vehicle perpendicular to a horizontal plane of the unmanned aerial vehicle. As such, by means of disposing the left and right additional lift propellers, a higher yawing moment can be obtained by relatively low lift force loss, and the heading axis control capacity of the aerial vehicle in a rotor mode is improved.

In one embodiment, the rotating shafts of the left additional lift propeller, the right additional lift propeller, and each lift propeller from among the first group of multiple lift propellers and the second group of multiple lift propellers outwards form angles of 5 degrees to 15 degrees relative to the vertical plane of the unmanned aerial vehicle perpendicular to the horizontal plane of the unmanned aerial vehicle. Similarly, as such, by means of disposing the lift propellers, a higher yawing moment can be obtained by relatively low lift force loss, and the heading axis control capacity of the aerial vehicle in a rotor mode is improved.

In one embodiment, the rotating shafts of the left additional lift propeller, the right additional lift propeller, and each lift propeller from among the first group of multiple lift propellers and the second group of multiple lift propellers outwards form angles of 8 degrees relative to the vertical plane of the unmanned aerial vehicle perpendicular to the horizontal plane of the unmanned aerial vehicle. It should be noted that the numerical value of the angle is only an example. In practice, it can be substantially set to be 8 degrees. The 8-degree outwards tilted propellers can avoid the interference of the airframe structure and reduce the physical dimension of rotor arrangement in case of making the gravity center of the airframe closer to a power center.

In one embodiment, the unmanned aerial vehicle further includes detachable cabins 130, 140 attached to a bottom side of the main body. Due to the above arrangement mode, the structure of the unmanned aerial vehicle can be flexibly adjusted. Cabins can be installed according to an actual situation if necessary, and are removed if unnecessary, so as to meet different needs to flexibly use the unmanned aerial vehicle and improve the adaptability of the unmanned aerial vehicle.

In one embodiment, the cabin is a passenger cabin 140 used to transport passengers.

In one embodiment, the cabin is a cargo space 130 used to convey material resources.

In one embodiment, the outward angle causes lift force loss of 0.5 to 3%. In one embodiment, the outward angle causes a yawing moment to be increased by 8 to 20%. In one embodiment, the outward angle causes the lift force loss of 0.97%. In one embodiment, the outward angle causes the yawing moment to be increased by 13.92%. Although the lift force of the unmanned aerial vehicle of the implementation mode is lost, the yawing moment is increased, so that relatively low lift force loss can be exchanged for a higher yaw moment, which improves the heading axis control capacity of the aerial vehicle in the rotor mode.

In one embodiment, the left linear supporting piece 103A is configured to connect the left main wing with the left front wing. The overall intensity of the airframe of the unmanned aerial vehicle can be enhanced.

In one embodiment, the ailerons and the main wings are configured to be a front wing structure. The main wing and the aileron as shown in FIG. 35 may be extending plates of the front wings as shown in the figures.

A loading VTOL fixed-wing unmanned aerial vehicle includes a plurality of groups of lift motors which are arranged on the left and right in parallel and are tilted by 8 degrees and used to realize takeoff, landing, flight and hovering. Two groups of electric propulsion motors are located at a nose and a tail of the aerial vehicle.

An existing aircraft flying in a multi-rotor mode realizes heading control by mainly depending on yawing moments generated by rotors in a rotating direction. Since in a stable-state flight, the yawing moments between all shafts cancel each other out. A rotating speed difference between the rotors in different rotating directions needs to be changed to generate resultant force of yawing. This method is low in efficiency of generating the yawing moment. When a power output is saturated or is nearly saturated, a relatively high lift force will be lost to generate an enough rotating speed difference. After the lift motors of the unmanned aerial vehicle of the present disclosure arranged on the left and right in parallel are outwards tilted 8 degrees, the lift force loss is) $1-\cos(8°)=0.97\%$, and the additional yawing moment caused by tilting is increased by) $\sin(8°)=13.92\%$. Therefore, a higher yawing moment can be exchanged by relatively low lift force loss, and the heading axis control capacity of the aerial vehicle in the rotor mode is improved.

The 5 to 15-degree, preferably 8-degree, outwards tilted rotor propellers can avoid the interference of the airframe structure and reduce the physical dimension of rotor arrangement in case of making the gravity center of the airframe closer to a power center. This arrangement mode can greatly improve the heading control capacity of the loading VTOL unmanned aerial vehicle nearly without losing the lift force, and effectively control the size of the airframe. Therefore, by means of a power layout method using the plurality of groups of 8-degrees outwards tilted lift motors arranged on the left and right in parallel and 2 groups of propulsion motors on the VTOL unmanned aerial vehicle, the problem of low heading axis control capacity with a high load is solved, and the problem of interference of the airframe structure of the VTOL unmanned aerial vehicle is solved. The overall size is controlled, i.e., the heading axis control capacity of the unmanned aerial vehicle of the present disclosure is improved, and the restriction to the design size of the unmanned aerial vehicle is reduced.

The unmanned aerial vehicle 100 can have at least one propulsion propeller to push the unmanned aerial vehicle 100 in a forward direction. In one implementation mode as shown in FIG. 1e, there can be two propulsion propellers 107A and 107B. The two propulsion propellers 107A and 107B may be respectively arranged on the far ends of the rear parts of the linear supporting pieces 103A and 103B.

In another implementation mode, in the implementation mode as shown in FIG. 31, the flight platform 101 may have no propulsion propeller. In this implementation mode, the flight platform 101 can be attached to the passenger cabin or the cargo space, and the passenger cabin or the cargo space is provided with a propulsion propeller. FIG. 32 illustrates an implementation mode of a passenger cabin provided with a propulsion propeller at its rear end. When the passenger cabin is attached to the flight platform 101 of FIG. 31, the propulsion propeller forwards pushes the flight platform 101.

Two vertical stabilizers 106A and 106B can be respectively provided near the rear ends of the linear supporting pieces 103A and 103B. Although they are shown pointing down, there can also be implementation modes in which they point up.

In another implementation mode, the main wings 104A, 104B can each have a wing tip lift propeller 109A, 109B arranged at their far ends, i.e., the end parts away from the main body 102. This can be realized by respectively providing wing tip vertical stabilizers 110A, 110B at the far ends of the main wings 104A, 104B and providing the lift propellers 109A, 109B at the upper tip ends of each of the wing tip vertical stabilizers 110A, 110B. It is defined here that the end part of the left main wing 104A is a left wing tip vertical stabilizer 110A and the end part of the right main wing 104B is a right wing tip vertical stabilizer 110B. For example, the left wing tip vertical stabilizer 110A and the right wing tip vertical stabilizer 110B are of platy structures parallel to the XZ plane. These wing tip lift propellers 109A, 109B can be smaller than the lift propellers arranged on the linear supporting pieces 103A, 103B.

These wing tip lift propellers 109A, 109B can be used to effectively and efficiently control the unmanned aerial vehicle 100 to roll over. These wing tip lift propellers 109A, 109B are located at the farthest ends away from the center axis of the unmanned aerial vehicle 100. It is effective to adjust the rollover of the unmanned aerial vehicle 100, and wing tip lift propellers with diameters less than the diameters of other lift propellers can be used.

Preferably, the rotating shaft of the wing tip lift propeller outwards deflects 5 to 15 degrees relative to the plane, i.e., the XZ plane, in the lengthwise of the unmanned aerial vehicle 100. It is easily understood that the rotating shaft of the wing tip lift propeller outwards deflects 5 to 15 degrees relative to the XZ plane, so that when the rotating speeds of the wing tip lift propellers above the left main wing 104A and the right main wing 104B are different, i.e., when the unmanned aerial vehicle 100 rolls over, a rolling moment generated by the wing tip lift propellers is increased, and the unmanned aerial vehicle 100 is easily controlled to roll over.

As further shown in FIG. 1e, there is a cabin 130 usually attached below the main body 102 of the unmanned aerial vehicle 100.

Now referring to the details of FIG. 2, the unmanned aerial vehicle 100 is expected to be used as any type of undercarriages. In one implementation mode, the unmanned aerial vehicle 100 has four single blade reeds 112A, 112B, 112C, 112D serving as undercarriages. The two single blade reeds 112A, 112C in the front are respectively arranged at the far ends of the folding legs 111A, 111B. During the flight, the folding legs 111A, 111B can respectively retract into internal spaces of the left and right linear supporting pieces 103A and 103B.

The two single blade reeds 112B, 112D at the back are expected to be respectively arranged at the far ends of the bottoms of the vertical stabilizers 106A, 106B.

The expected single blade reeds 112A, 112B, 112C, 112D can be made of a proper material to provide sufficient elasticity and integrity. This material includes natural and synthetic polymers, various metal and metal alloy, natural materials, textile fiber, and all other reasonable combinations. In one implementation mode, carbon fiber is used.

Now referring to FIG. 3, a cabin serving as a cargo space 130 is illustrated. The cargo space 130 can have single blade reeds 135A, 135B, 135C, 135D serving as its undercarriages. Or, the cargo space can have other types of undercarriages, such as sliding rails, leg racks and wheels.

In an expected implementation mode, the cargo space 130 can be removed from other parts of the unmanned aerial vehicle 100. The other part of the unmanned aerial vehicle can be referred to as the flight platform 101. The flight platform 101 can fly without a cabin, and can interchangeably carry different cabins. As described later, the flight platform 101 can also carry a passenger cabin.

In the illustrated examples, all the cabins 130, 140 are carried below the flight platform 101. It is expected to load the cabins 130, 140 on the ground, and the loading process can be completed before or after the flight platform 101 is attached to the cabins 130, 140.

FIG. 5 illustrates a top view of the flight platform 101. The flight platform may have a substantially flat structure and can carry a load below or above. During a high-speed flight, all the six lift propellers 108A, 108B, 108C, 108D, 108E, 108F can be locked in place, so that each blade is parallel to the main body 102.

FIG. 5 illustrates one implementation mode of the flight platform 101. The length of each front wing 105A, 105B is not greater than half of the length of each of the main wings 104A, 104B.

FIG. 6 broadly illustrates a front view of the flight platform 101 having a detachably attached cargo space 130. The cargo space 130, the passenger cabin 140 or any other type of load is particularly expected to have energy storage cell 150 arranged in the main body 102 of the flight platform. Stored energy can be used to supply power to other components of the flight platform, such as the lift propellers 108A, 108B, 108C, 108D and the propulsion propellers 107A, 107B. The stored energy may be electricity, and the storage cell may be a battery. In another implementation mode, the energy storage cell 150 may be used to supply power to accessories in the cabins 130, 140.

These batteries 150 may also be arranged in other components of the flight platform 101, such as the linear supporting pieces 103A, 103B.

Alternatively or optionally, there may be energy storage cells 155 arranged in the cabins 130, 140. Energy stored in the storage cells 155 can be used to supply power to the lift propellers 108A, 108B, 108C, 108D and the propulsion propellers 107A, 107B. The stored energy may be electricity, and the storage cell may be a battery. The cabins 130, 140 have the energy storage cells 155, so that the flight platform 101 will have supplemented energy source whenever it picks up new cabins 130, 140. The flight platform 101 itself may be an emergency energy storage or a low-capacity battery 150. When the flight platform 101 flies without cabins 130, 140, power is supplied to the flight platform 101 within relatively short time. In one implementation mode, main power of the flight platform 101 is from the batteries 150 located in the cabins 130, 140. In such a mode, when the old cabins 130, 140 on the flight platform 101 are replaced by new cabins 130, 140, the flight platform 101 or the whole VTOL unmanned aerial vehicle system 100 will have a completely rechargeable energy source. This is a beneficial method, so the VTOL unmanned aerial vehicle does not need to charge itself. In a preferred implementation mode, the flight platform 101 can continuously work/fly several hours and even several days, pick up cargo spaces/passenger cabins, and disboard the cargo spaces/passenger cabins without stopping to charge its battery.

Now referring to the details of FIG. 7, a passenger cabin 150 is provided. The passenger cabin 150 can use any type of undercarriage, such as a rigid leg 145A, 145B, 145C, 145D as shown in the figures.

FIG. 10 broadly illustrates one aspect of the present disclosure. A cabin (either a cargo space or a passenger cabin) is detachable. The passenger cabin 140 can be selectively separated from the flight platform 101. Engagement and disengagement between the flight platform 101 and the cabin 140 can be executed autonomously by a computer and/or other sensors and computing devices (no user's intervention is needed). Alternatively or optionally, a user can actively control and guide the engagement and disengagement between the flight platform 101 and the cabin 140.

Those of ordinary skill in the art can know that various different types of engaging mechanisms 147 can be used to fix the cabin 140 to the flight platform 101. For example, the engaging mechanism can be a mechanical lock catch, a mechanical lock catch, a track and a groove, or a combination of any known engaging modes.

It is important to understand that alternatively or optionally, there can be one center propulsion propeller 117 connected to the rear end of the main body 102 (as shown in FIG. 12) besides the two propulsion propellers 107A and 107B (as shown in FIG. 11). As shown in FIG. 12, the center propulsion propeller 117 is engaged to the rear end of the main body 102 through a vertical expander 116. The vertical expander 116 may be of any structure in any shape, so as to be physically engaged with the propulsion propeller 117, so that a rotating center of the propulsion propeller 117 perpendicularly deflects away from the main body 102. In another implementation mode, the propulsion propeller 117 perpendicularly deflects away from the main body 102, so that the rotating center of the propulsion propeller 117 is perpendicularly located at the rear part of the cabin 140 or is perpendicularly flush with the cabin 140. In another implementation mode, the propulsion propeller 117 is perpendicularly flush with the top of the cabin 140. In another implementation mode, the propulsion propeller 117 is perpendicularly flush with the middle part of the cabin 140. In a further implementation mode, the propulsion propeller 117 is perpendicularly flush with the bottom of the cabin 140.

What is not shown in any figure of the implementation mode is that the end parts of linear supporting pieces 103A and 103B are provided with no propulsion propellers 107A and 107B respectively. On the contrary, there is only one propulsion propeller 117 engaged with the rear end of the main body 102.

It can also be imaged that each linear supporting piece 103A, 103B can include three or more lift propellers. A relatively long linear supporting piece is provided to accommodate more lift propellers. A lift propeller with a relatively small diameter is used, or lift propellers are placed on both the top sides and the bottom sides of the linear supporting pieces. FIG. 13 illustrates one implementation mode. Two extra lift propellers 108G, 108H are arranged at the front ends of the bottoms of the linear supporting pieces 103A, 103B.

Although the propulsion propellers 107A and 107B have been shown in the previous figures and are located at the far ends of the rear parts of the linear supporting pieces 103A and 103B, it is specifically expected that these propellers 107A and 107B may be located below the horizontal planes of the main wings 104A and 104B, as shown in FIG. 13. In one aspect, these propulsion propellers 107A, 107B may be arranged on the horizontal planes of the cabins 130, 140 carried by the flight platform. In another aspect, these propulsion propellers 107A, 107B may be arranged in the middles of the vertical stabilizers 106A, 106B. One expected reason for lowering the positions of the propulsion propellers 107A, 107B is that the head dipping effect during the flight is minimized. The head dipping effect is possibly caused by the aerodynamical effect caused by the cabins 130, 140.

FIG. 14 to FIG. 30 illustrate implementation modes that the flight platform 101 or the cabin 130, 140 or both of them have an electric wheel 148 attached to it. In the implementation mode of FIG. 14, the flight platform 101 has an electric wheel 148. The cabin 130, 140 also has an electric wheel. Now referring to the implementation mode of FIG. 15, the single electric wheel 148 can have a motor sealed in a shell 149, and the motor can be driven by the power supplied by the energy storage cell 150 arranged in the cabin 130, 140.

It is imagined that the electric wheel 148 can enable the flight platform 101 and the cabin 130 to move on the ground when landing on the ground. This allows the cabin 130, 140 to move away from the flight platform 101 and allows another cabin 130, 140 to move to the flight platform 101 for engagement.

Or, this can allow the flight platform 101 to move away from the cabin 130 towards another cabin for engagement. In one implementation mode, each cabin 130, 140 can have an energy storage cell 155, so that when the flight platform 101 is engaged with a new and fully charged cabin 130, 140, the flight platform 101 is basically supplemented with its energy source.

In some implementation modes of the disclosed unmanned aerial vehicle system, at least one floating device 160 can be provided, which is engaged with at least one of the cargo space 130, the passenger cabin 140, and the flight platform 101. The floating device may be a type needing to be actuated. That is, the floating device is actively inflated with air or a material if necessary. In other words, in a particular implementation mode, the floating device 160 may be kept in a deflated state, and swells when inflation is triggered under certain conditions. For example, the floating device 160 can be automatically inflated during emergency landing, and can be automatically inflated during water landing. When any undercarriage fails in certain aspects, the floating device can be inflated.

Many known types of inflating mechanisms or air bag mechanisms can be implemented to realize the need and structure of the floating device 160 disclosed. The expected floating device 160 can be of a type that can be repeatedly reused, re-inflated, and re-deflated. The expected floating device 160 can also be disposable.

Alternatively or optionally, the inflating behavior can be activated by a user. For example, when an operator of the unmanned aerial vehicle system determines to inflate the floating device 160, the operator can send a signal to initiate inflation.

In some implementation modes, it should be particularly noted that he floating device 160 does not need to have an electric wheel 148. In other implementation modes, the floating device 160 is one part of the shell of the electric wheel 148.

As an example, referring to FIG. 26, the passenger cabin 140 can have an elongated floating device 160 arranged on either side of the cabin 140 and can be used as a water undercarriage. In FIG. 26, these floating devices 160 are deflated. FIG. 32 illustrates a side view of the deflated floating device 160. As shown in FIG. 33 and FIG. 34, the floating device 160 engaged with the passenger cabin 140 is inflated.

As another example, referring to FIG. 31, the flight platform 101 can have four floating devices 160 arranged at the tops of four electric wheels 148. These floating devices 160 at other positions can be alternatively attached to the electric wheels 148 or positions close to the electric wheels 148. In FIG. 31, these floating devices 160 engaged with the electric wheels 148 are deflated. FIG. 33 and FIG. 34 illustrate the inflated floating devices 160 of the flight platform 101.

Without departing from the spirit and scope of the disclosed implementation modes, those of ordinary skill in the art can make many changes and modifications. Therefore, it must be understood that the illustrated implementation modes are presented for illustrative purposes only, and should not be construed as limiting the implementation modes defined by the appended claims. For example, despite the fact that the elements of the claims are set forth below in a certain combination, it must be clearly understood that the implementation mode includes other combinations of fewer, more or different elements, which are disclosed herein, even if such combinations are not limited at the beginning.

Therefore, specific implementation modes and applications of a VTOL flight platform with interchangeable cabins have been disclosed. However, it is obvious to those skilled in the art that more modifications other than those already described are possible without departing from the concepts disclosed herein. Therefore, the disclosed implementation modes are not limited except for the spirit of the appended claims. In addition, during explanation of the specification and claims, all terms should be interpreted in the broadest possible manner consistent with the context. In particular, the terms "include" and "including" should be interpreted as citing elements, components, or steps in a non-exclusive manner, indicating that the cited elements, components, or steps may exist, or be utilized, or be combined with other elements, components or steps that are not explicitly cited. Insubstantial changes in the claimed subject that are now known or later expected to be seen by those of ordinary skill in the art are clearly expected to be equivalent within the scope of the claims. Therefore, obvious substitutions now or later known to those of ordinary skill in the art are defined as being within the scope of the defined elements. Therefore, the claims should be understood to include the content specifically illustrated and described above, the content that is conceptually equivalent, the content that can be obviously replaced, and the content that basically contains the basic ideas of the implementation modes. In addition, in the case where the specification and claims involve at least one of the group consisting of A, B, C . . . and N, the text shall be interpreted as requiring at least one element in the group, including N, instead of A and N, or B and N, etc.

What is claimed is:

1. A method of flight control in a vertical takeoff and landing aerial vehicle, said method comprising:
providing a main body;
providing a left main wing and a right main wing which are respectively engaged with the main body;
providing a left front wing and a right front wing which are respectively engaged with the main body;
providing a left linear supporting piece arranged on the left main wing;
providing a right linear supporting piece arranged on the right main wing;
providing a first group of multiple lift propellers arranged on the left linear supporting piece; and
providing a second group of multiple lift propellers arranged on the right linear supporting piece;
wherein an outwards deflecting included angle less than 90 degrees is provided between a rotating shaft of each of the first group of multiple lift propellers and a plane in a lengthwise direction of the aerial vehicle; and an outwards deflecting included angle less than 90 degrees is provided between a rotating shaft of each of the second group of multiple lift propellers and the plane in the lengthwise direction of the aerial vehicle;
wherein the included angles between the rotating shaft of each lift propeller from among the first group of multiple lift propellers and the second group of multiple lift propellers and the plane in the lengthwise direction of the aerial vehicle is 5 degrees to 15 degrees; and
wherein the included angles between two adjacent lift propellers in the first group of multiple lift propellers and the plane in the lengthwise direction of the aerial vehicle are different, and the included angles between two adjacent lift propellers in the second group of multiple lift propellers and the plane in the lengthwise direction of the aerial vehicle are different.

2. The method as recited in claim 1, providing a left wing tip vertical stabilizer disposed at an end part of the left main wing away from the main body; providing a right wing tip vertical stabilizer at an end part of the right main wing away from the main body.

3. The method as recited in claim 2, providing a left wing tip propeller disposed on a top end of the left wing tip vertical stabilizer; and providing a right wing tip propeller disposed on a top end of the right wing tip vertical stabilizer.

4. The method as recited in claim 2, wherein one of the included angles between the rotating shaft of each lift propeller from among the first group of multiple lift propellers and the plane in the lengthwise direction of the aerial vehicle is 8 degrees.

5. The method as recited in claim 2, wherein one of the included angles between the rotating shaft of each lift propeller from among the second group of multiple lift propellers and the plane in the lengthwise direction of the aerial vehicle is 8 degrees.

6. The method as recited in claim 5, further providing a cabin coupled to a bottom side of the main body.

7. The method as recited in claim 6, wherein the cabin is detachably attached to the bottom side of the main body.

8. The method as recited in claim 6, wherein the cabin is a passenger cabin.

9. The method as recited in claim 6, wherein the cabin is a cargo cabin.

10. The method as recited in claim 6, providing the left linear supporting piece to connect the left main wing to the left front wing.

* * * * *